(12) United States Patent
Rico Alvarino et al.

(10) Patent No.: US 11,778,566 B2
(45) Date of Patent: Oct. 3, 2023

(54) TRANSMISSION PARAMETER MODIFICATION FOR UPLINK COMMUNICATIONS

(71) Applicant: QUALCOMM Incorporated, San Diego, CA (US)

(72) Inventors: Alberto Rico Alvarino, San Diego, CA (US); Xiao Feng Wang, San Diego, CA (US); Liangping Ma, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/165,394

(22) Filed: Feb. 2, 2021

(65) Prior Publication Data

US 2021/0250871 A1  Aug. 12, 2021

Related U.S. Application Data

(60) Provisional application No. 62/972,389, filed on Feb. 10, 2020.

(51) Int. Cl.
*H04B 7/185* (2006.01)
*H04W 52/14* (2009.01)
(Continued)

(52) U.S. Cl.
CPC ......... *H04W 52/146* (2013.01); *H04L 1/0003* (2013.01); *H04W 52/242* (2013.01); *H04W 52/367* (2013.01)

(58) Field of Classification Search
CPC ..... H04W 52/24; H04W 52/50; H04W 52/16; H04W 52/12; H04W 52/146;
(Continued)

(56) References Cited

U.S. PATENT DOCUMENTS 8,351,974 B2 *  1/2013  Ahn ................ H04L 1/0032
                                            370/320
9,014,618 B2 *  4/2015  Chami ............. H04W 52/287
                                            455/11.1
(Continued)

FOREIGN PATENT DOCUMENTS

WO    2019032237 A1    2/2019

OTHER PUBLICATIONS

Intel Corporation: "Support of Link Adaptation for UL Grant-Free NOMA Schemes," 3GPP Draft, 3GPP TSG-RAN WG1 #86bis, R1-1610374 La Grant-Freenoma, 3rd Generation Partnership Project (3GPP), Mobile Competence Centre; 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016, XP051150385, 4 Pages, Retrieved from the Internet: URL: http://www.3gpp.org/ftp/Meetings_3GPP_SYNC/RAN1/Docs/ [retrieved on Oct. 9, 2016] Section 3, p. 2-p. 3.
International Search Report and Written Opinion—PCT/US2021/016295—ISA/EPO—dated May 11, 2021.

*Primary Examiner* — Phuongchau Ba Nguyen
(74) *Attorney, Agent, or Firm* — Harrity & Harrity LLP/Qualcomm Incorporated

(57) ABSTRACT

Some techniques and apparatuses described herein enable a user equipment (UE) to autonomously modify one or more transmission parameters, other than a transmit power, for uplink communications after detecting a change in pathloss. The UE may modify the one or more transmission parameters without receiving instructions from a base station, such as in downlink control information, with updated value(s) for the one or more transmission parameters. As a result, the UE and the base station avoid the round trip delay that would otherwise be required to modify the transmission parameter(s) and perform link adaptation. Some techniques and apparatuses described herein apply to non-terrestrial (Continued)

networks with a large round trip delay. Other aspects are described.

30 Claims, 15 Drawing Sheets

(51) Int. Cl.
*H04W 52/24* (2009.01)
*H04L 1/00* (2006.01)
*H04W 52/36* (2009.01)

(58) Field of Classification Search
CPC ............. H04W 52/242; H04W 52/367; H04W 52/262; H04W 52/365; H04L 1/0003; H04L 1/0009; H04L 1/0015; H04L 1/0029
See application file for complete search history.

(56) References Cited

U.S. PATENT DOCUMENTS

| | | | |
|---|---|---|---|
| 2007/0293260 A1* | 12/2007 | Xiao ................... | H04W 52/265 |
| | | | 455/522 |
| 2010/0158147 A1* | 6/2010 | Zhang ................ | H04W 52/242 |
| | | | 455/522 |
| 2013/0035132 A1* | 2/2013 | Shin .................... | H04W 52/265 |
| | | | 455/522 |
| 2017/0222749 A1* | 8/2017 | Dinan ............... | H04W 74/0808 |
| 2018/0310298 A1* | 10/2018 | Li .......................... | H04L 5/0055 |
| 2019/0053166 A1* | 2/2019 | Nagaraja ............... | H04W 72/21 |
| 2021/0136694 A1* | 5/2021 | Gao ..................... | H04W 52/245 |
| 2021/0289445 A1* | 9/2021 | Muruganathan .... | H04W 52/367 |
| 2022/0110067 A1* | 4/2022 | Ryu ..................... | H04W 24/08 |
| 2022/0217654 A1* | 7/2022 | Kang ................. | H04W 52/242 |
| 2022/0264484 A1* | 8/2022 | Chen ................ | H04W 36/0055 |

* cited by examiner

| MCS | Sensitivity / Power Level (dBm/Hz) |
|---|---|
| 0 | -130 dBm/Hz |
| 6 | -120 dBm/Hz |
| 10 | -110 dBm/Hz |
| ⋮ | ⋮ |

TRANSMISSION PARAMETER MODIFICATION FOR UPLINK COMMUNICATIONS

CROSS-REFERENCE TO RELATED APPLICATION

This Patent application claims priority to U.S. Provisional Patent Application No. 62/972,389, filed on Feb. 10, 2020, entitled "TRANSMISSION PARAMETER MODIFICATION FOR UPLINK COMMUNICATIONS," and assigned to the assignee hereof. The disclosure of the prior Application is considered part of and is incorporated by reference into this Patent Application.

BACKGROUND

Field

Aspects of the present disclosure generally relate to wireless communication and to techniques and apparatuses for transmission parameter modification for uplink communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In a non-terrestrial network (NTN), the round trip delay for communications between a base station and a user equipment (UE) is large (e.g., 500 milliseconds or more). As a result, link adaptation cannot be performed quickly, which can cause long bursts of error if channel conditions change. In some cases, a UE may use a measured pathloss to perform link adaptation for uplink communications. For example, if channel conditions degrade, the UE may detect the degradation of channel conditions using a downlink pathloss measurement, and the UE may increase a transmit power used for an uplink communication to compensate for the degraded channel conditions. However, if the UE is already transmitting uplink communications using a maximum transmit power, then the UE may be unable to increase the transmit power to compensate for increased pathloss. This may cause packet loss.

Some techniques and apparatuses described herein enable a UE to autonomously modify one or more transmission parameters, other than a transmit power, for uplink communications after detecting a change in pathloss. The UE may modify the one or more transmission parameters without receiving instructions from a base station, such as in downlink control information, with updated value(s) for the one or more transmission parameters. As a result, the UE and the base station avoid the round trip delay that would otherwise be required to modify the transmission parameter(s) and perform link adaptation. Some techniques and apparatuses described herein apply to non-terrestrial networks with a large round trip delay. However, these techniques and apparatuses can also be applied to wireless networks other than non-terrestrial network to perform fast link adaptation and reduce packet loss.

In some aspects, a method of wireless communication performed by a UE includes receiving a configuration for uplink communications; determining a required transmit power for an uplink communication, wherein the required transmit power is determined based at least in part on a pathloss parameter measured by the UE; modifying at least one transmission parameter for the uplink communication based at least in part on the configuration if the required transmit power is greater than a maximum transmit power, wherein the at least one transmission parameter includes at least one of a modulation and coding scheme, a transport block size, or a resource allocation; and transmitting the uplink communication using the modified at least one transmission parameter.

In some aspects, a UE for wireless communication includes a memory; and one or more processors operatively coupled to the memory, the memory and the one or more processors configured to: receive a configuration for uplink communications; determine a required transmit power for an uplink communication, wherein the required transmit power is determined based at least in part on a pathloss parameter measured by the UE; modify at least one transmission parameter for the uplink communication based at least in part on the configuration if the required transmit power is greater than a maximum transmit power, wherein the at least one transmission parameter includes at least one of a modulation and coding scheme, a transport block size, or a resource allocation; and transmit the uplink communication using the modified at least one transmission parameter.

In some aspects, a non-transitory computer-readable medium storing a set of instructions for wireless communication includes one or more instructions that, when executed by one or more processors of a UE, cause the UE to: receive a configuration for uplink communications; determine a required transmit power for an uplink communication, wherein the required transmit power is determined based at least in part on a pathloss parameter measured by the UE; modify at least one transmission parameter for the uplink communication based at least in part on the configuration if the required transmit power is greater than a maximum transmit power, wherein the at least one transmission parameter includes at least one of a modulation and coding scheme, a transport block size, or a resource allocation; and transmit the uplink communication using the modified at least one transmission parameter.

In some aspects, an apparatus for wireless communication includes means for receiving a configuration for uplink communications; means for determining a required transmit power for an uplink communication, wherein the required transmit power is determined based at least in part on a pathloss parameter measured by the apparatus; means for modifying at least one transmission parameter for the uplink communication based at least in part on the configuration if the required transmit power is greater than a maximum transmit power, wherein the at least one transmission parameter includes at least one of a modulation and coding scheme, a transport block size, or a resource allocation; and means for transmitting the uplink communication using the modified at least one transmission parameter.

In some aspects, a method of wireless communication, performed by a UE, may include receiving a configuration associated with modifying one or more transmission parameters, other than a transmit power, for uplink communications; determining that a required transmit power for an uplink communication is greater than a maximum transmit power, wherein the required transmit power is determined based at least in part on downlink control information for the uplink communication; modifying at least one transmission parameter, of the one or more transmission parameters, based at least in part on the configuration and based at least in part on determining that the required transmit power for the uplink communication is greater than the maximum transmit power; and transmitting the uplink communication using the modified at least one transmission parameter.

In some aspects, a method of wireless communication, performed by a UE, may include receiving a configuration associated with modifying one or more transmission parameters, other than a transmit power, for uplink communications; determining a required transmit power for an uplink communication, wherein the required transmit power is determined based at least in part on downlink control information for the uplink communication; determining a maximum transmit power for the uplink communication; modifying a transmission parameter, of the one or more transmission parameters, based at least in part on the configuration, the required transmit power, and the maximum transmit power; and transmitting the uplink communication using the modified transmission parameter.

In some aspects, a method of wireless communication, performed by a base station, may include transmitting a configuration associated with modifying one or more transmission parameters, other than a transmit power, for uplink communications; transmitting downlink control information that indicates a transmission parameter value, for a transmission parameter of the one or more transmission parameters, for an uplink communication; receiving the uplink communication, wherein the uplink communication is transmitted using a modified transmission parameter value that is different from the transmission parameter value indicated in the downlink control information; and decoding the uplink communication.

In some aspects, a UE for wireless communication may include a memory and one or more processors operatively coupled to the memory. The memory and the one or more processors may be configured to receive a configuration associated with modifying one or more transmission parameters, other than a transmit power, for uplink communications; determine that a required transmit power for an uplink communication is greater than a maximum transmit power, wherein the required transmit power is determined based at least in part on downlink control information for the uplink communication; modify at least one transmission parameter, of the one or more transmission parameters, based at least in part on the configuration and based at least in part on determining that the required transmit power for the uplink communication is greater than the maximum transmit power; and transmit the uplink communication using the modified at least one transmission parameter.

In some aspects, a UE for wireless communication may include a memory and one or more processors operatively coupled to the memory. The memory and the one or more processors may be configured to receive a configuration associated with modifying one or more transmission parameters, other than a transmit power, for uplink communications; determine a required transmit power for an uplink communication, wherein the required transmit power is determined based at least in part on downlink control information for the uplink communication; determine a maximum transmit power for the uplink communication; modify a transmission parameter, of the one or more transmission parameters, based at least in part on the configuration, the required transmit power, and the maximum transmit power; and transmit the uplink communication using the modified transmission parameter.

In some aspects, a base station for wireless communication may include a memory and one or more processors operatively coupled to the memory. The memory and the one or more processors may be configured to transmit a configuration associated with modifying one or more transmission parameters, other than a transmit power, for uplink communications; transmit downlink control information that indicates a transmission parameter value, for a transmission parameter of the one or more transmission parameters, for an uplink communication; receive the uplink communication, wherein the uplink communication is transmitted using a modified transmission parameter value that is different from the transmission parameter value indicated in the downlink control information; and decode the uplink communication.

In some aspects, a non-transitory computer-readable medium may store one or more instructions for wireless communication. The one or more instructions, when executed by one or more processors of a UE, may cause the one or more processors to receive a configuration associated with modifying one or more transmission parameters, other than a transmit power, for uplink communications; determine that a required transmit power for an uplink communication is greater than a maximum transmit power, wherein the required transmit power is determined based at least in part on downlink control information for the uplink communication; modify at least one transmission parameter, of the one or more transmission parameters, based at least in part on the configuration and based at least in part on determining that the required transmit power for the uplink communication is greater than the maximum transmit power; and transmit the uplink communication using the modified at least one transmission parameter.

In some aspects, a non-transitory computer-readable medium may store one or more instructions for wireless communication. The one or more instructions, when executed by one or more processors of a UE, may cause the one or more processors to receive a configuration associated with modifying one or more transmission parameters, other than a transmit power, for uplink communications; determine a required transmit power for an uplink communication, wherein the required transmit power is determined based at least in part on downlink control information for the uplink communication; determine a maximum transmit power for the uplink communication; modify a transmission parameter, of the one or more transmission parameters, based at least in part on the configuration, the required transmit power, and the maximum transmit power; and transmit the uplink communication using the modified transmission parameter.

In some aspects, a non-transitory computer-readable medium may store one or more instructions for wireless communication. The one or more instructions, when executed by one or more processors of a base station, may cause the one or more processors to transmit a configuration associated with modifying one or more transmission parameters, other than a transmit power, for uplink communications; transmit downlink control information that indicates a transmission parameter value, for a transmission parameter of the one or more transmission parameters, for an uplink communication; receive the uplink communication, wherein the uplink communication is transmitted using a modified transmission parameter value that is different from the transmission parameter value indicated in the downlink control information; and decode the uplink communication.

In some aspects, an apparatus for wireless communication may include means for receiving a configuration associated with modifying one or more transmission parameters, other than a transmit power, for uplink communications; means for determining that a required transmit power for an uplink communication is greater than a maximum transmit power, wherein the required transmit power is determined based at least in part on downlink control information for the uplink communication; means for modifying at least one transmission parameter, of the one or more transmission parameters, based at least in part on the configuration and based at least in part on determining that the required transmit power for the uplink communication is greater than the maximum transmit power; and means for transmitting the uplink communication using the modified at least one transmission parameter.

In some aspects, an apparatus for wireless communication may include means for receiving a configuration associated with modifying one or more transmission parameters, other than a transmit power, for uplink communications; means for determining a required transmit power for an uplink communication, wherein the required transmit power is determined based at least in part on downlink control information for the uplink communication; means for determining a maximum transmit power for the uplink communication; means for modifying a transmission parameter, of the one or more transmission parameters, based at least in part on the configuration, the required transmit power, and the maximum transmit power; and means for transmitting the uplink communication using the modified transmission parameter.

In some aspects, an apparatus for wireless communication may include means for transmitting a configuration associated with modifying one or more transmission parameters, other than a transmit power, for uplink communications; means for transmitting downlink control information that indicates a transmission parameter value, for a transmission parameter of the one or more transmission parameters, for an uplink communication; means for receiving the uplink communication, wherein the uplink communication is transmitted using a modified transmission parameter value that is different from the transmission parameter value indicated in the downlink control information; and means for decoding the uplink communication.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIGS. 3-8 are diagrams illustrating examples of transmission parameter modification for uplink communications.

DETAILED DESCRIPTION

Figure 1:
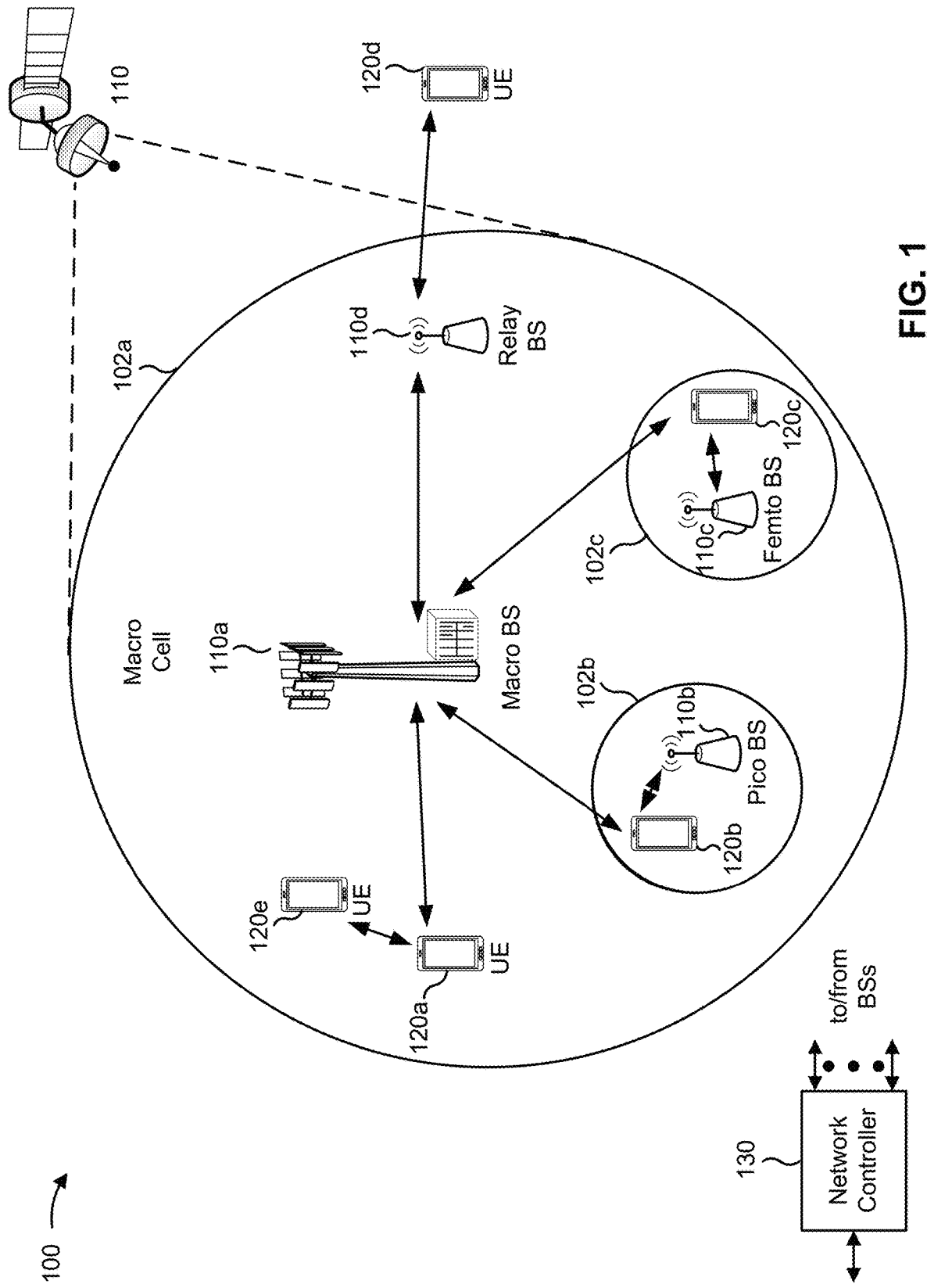
FIG. 1 is diagram illustrating an example of a wireless communication network.

The detailed description set forth below in connection with the appended drawings is intended as a description of various configurations and is not intended to represent the only configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

In some examples, a cell may be provided by a base station 110 of a non-terrestrial network (NTN), also referred to as a non-terrestrial base station 110 or a non-terrestrial access point. As used herein, "non-terrestrial network" may refer to a network for which access is provided by or assisted by a non-terrestrial base station 110. In some NTN deployments, a non-terrestrial base station 110 may be located on an airborne vehicle or a vehicle in orbit, such as a satellite, a balloon, a dirigible, an airplane, an unmanned aerial vehicle, a drone, or the like. In some NTN deployments (e.g., sometimes referred to as a transparent architecture or a bent pipe architecture), a non-terrestrial base station 110 may act as a relay station to relay communications between a UE 120 and a terrestrial base station 110 (such as a base station 110 located on the ground or on a tower). In this case, the non-terrestrial base station 110 (e.g., on an airborne vehicle or a vehicle in orbit), may perform frequency translation and/or radio frequency amplification for communications relayed between the UE 120 and a terrestrial base station 110. For example, the UE 120 may transmit an uplink communication to the non-terrestrial base station 110, which may relay the uplink communication to a terrestrial base station 110 (e.g., after performing frequency translation, radio frequency amplification, and/or the like). The terrestrial base station 110 may perform additional processing on the uplink communication and/or may transmit the uplink communication to a core network. The terrestrial base station 110 may transmit a downlink communication to the non-terrestrial base station 110, which may relay the downlink communication to the UE 120 (e.g., after performing frequency translation, radio frequency amplification, and/or the like). In some aspects, a UE 120 and/or the terrestrial base station 110 may be referred to as a ground station (GS).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
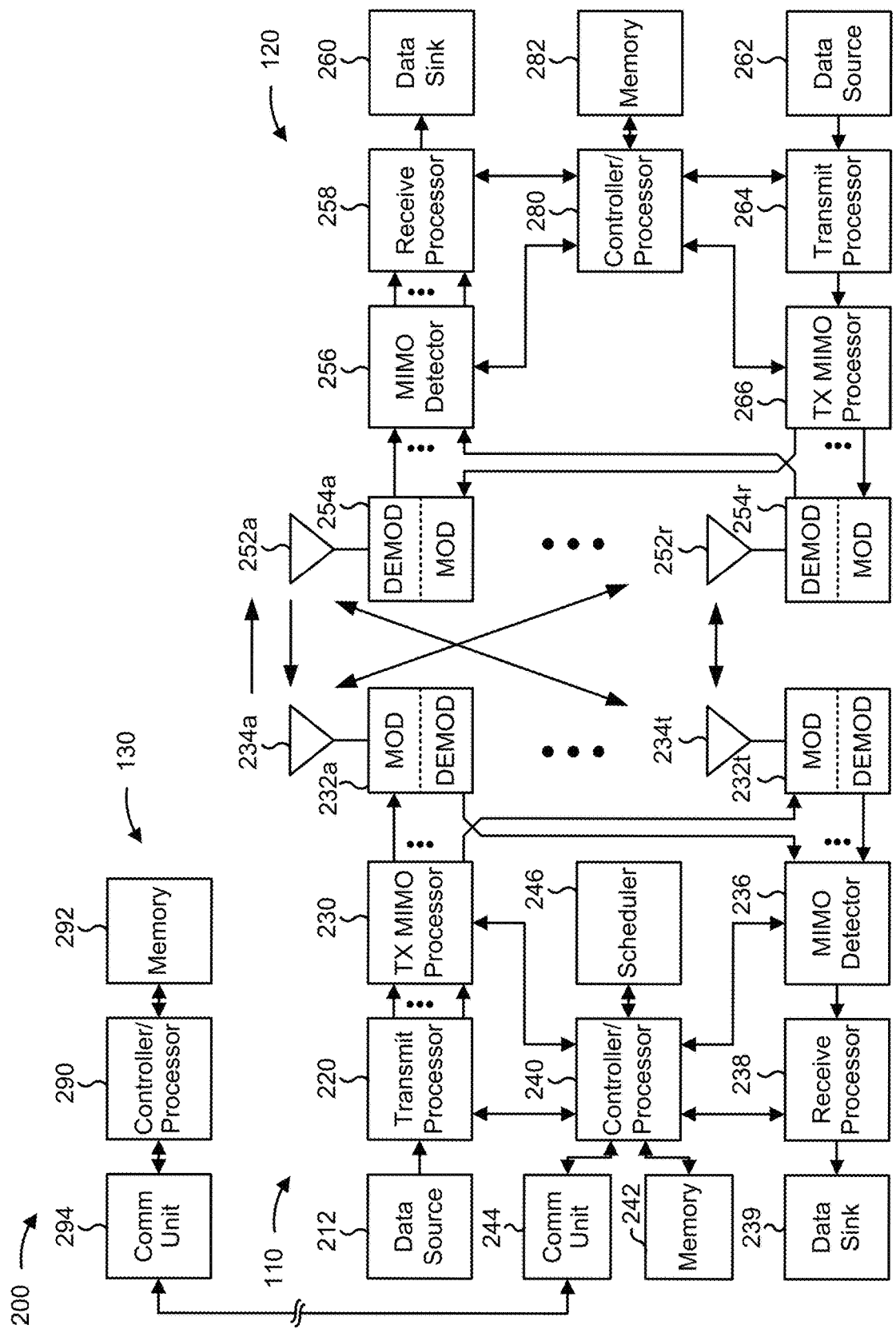
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency-division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received power (RSRQ), CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, cyclic prefix-OFDM (CP-OFDM), and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmission parameter modification for uplink communications, as described in more detail elsewhere herein. For example, controller/processor 240 of base station 110, controller/processor 280 of UE 120, and/or any other component(s) of FIG. 2 may perform or direct operations of, for example, method 900 of FIG. 9, method 1000 of FIG. 10, method 1100 of FIG. 11, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Figure 3:
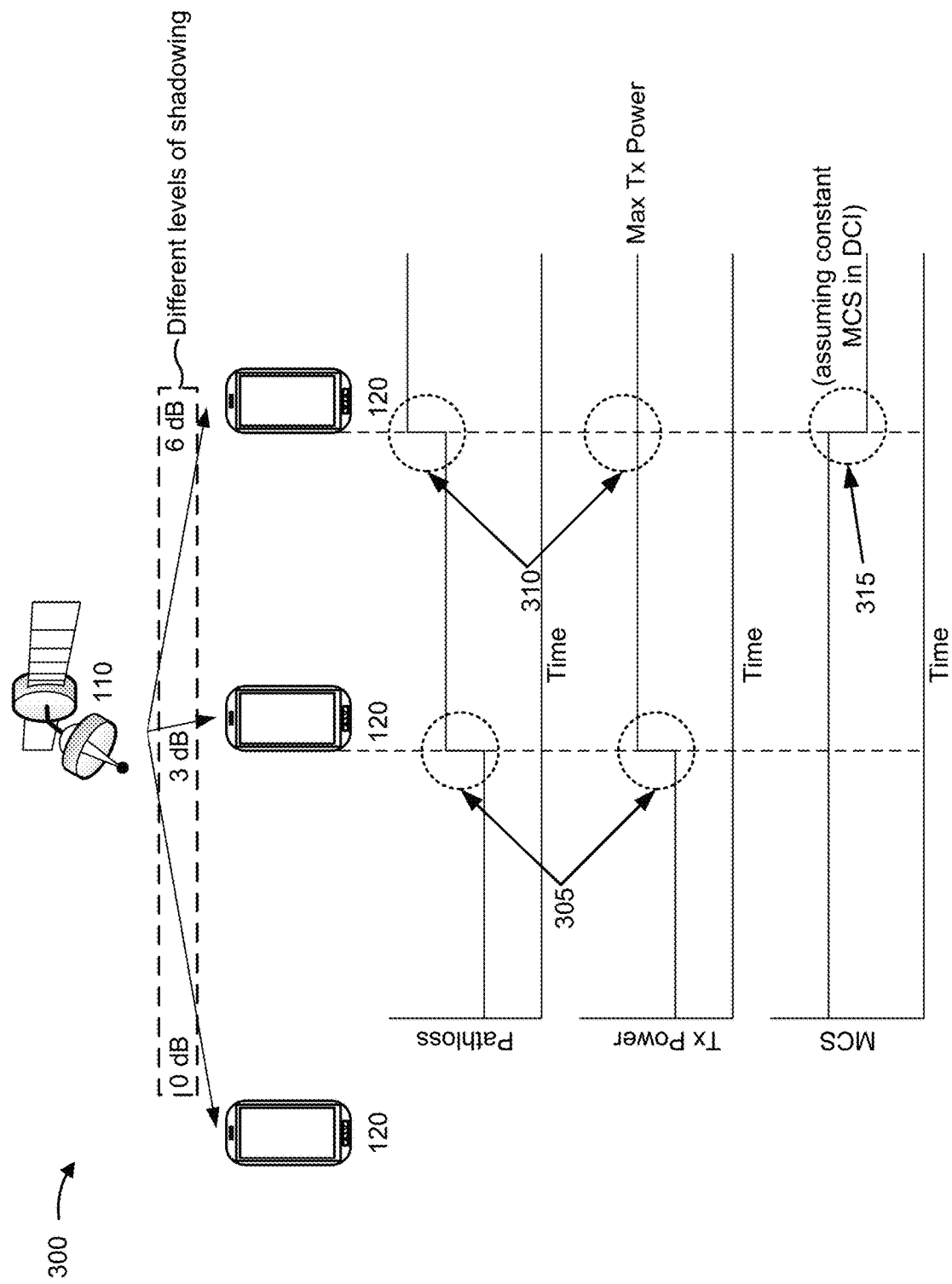

FIG. 3 is a diagram illustrating an example 300 of transmission parameter modification for uplink communications. As shown in FIG. 3, a non-terrestrial base station 110 (sometimes referred to herein as a base station 110) and a UE 120 may communicate with one another at multiple points in time.

In a non-terrestrial network (NTN), such as an NTN with a transparent architecture or a bent pipe architecture, the round trip delay for communications between the base station 110 and the UE 120 is large (e.g., 500 milliseconds or more for a geosynchronous (GEO) NTN base station 110). As a result, link adaptation cannot be performed quickly, which can cause long bursts of error if channel conditions change (e.g., due to different levels of shadowing, fading, and/or the like, over time). In some cases, a UE 120 may use pathloss determined (e.g. measured) based at least in part on downlink communications to perform link adaptation for uplink communications. For example, if channel conditions degrade, the UE 120 may detect the degradation of channel conditions using a downlink pathloss measurement, and may increase a transmit power used for an uplink communication to compensate for the degraded channel conditions. This is shown at 305 of FIG. 3, where the UE 120 determines that pathloss has increased and compensates for the increased pathloss by increasing a transmit power of an uplink communication.

However, if the UE 120 is already transmitting uplink communications using a maximum transmit power, then the UE 120 may be unable to increase the transmit power to compensate for increased pathloss. The maximum transmit power may refer to a maximum allowed transmit power (e.g., defined in a wireless communication standard), a configured maximum output power $P_{CMAX}$, a configured maximum output power $P_{CMAX,f}$ for a carrier f, a configured maximum output power $P_{CMAX,c}$ for a cell c (e.g., a serving cell), a configured maximum output power $P_{CMAX,f,c}$ for a carrier f of a cell c, a maximum transmit power determined based at least in part on a maximum power reduction, and/or the like. This is shown at 310 of FIG. 3, where the UE 120 determines that pathloss has increased, but is unable to compensate for the increased pathloss by increasing a transmit power of an uplink communication because the UE 120 is already transmitting uplink communications at a maximum transmit power. This may cause packet loss. For example, if a link between the UE 120 and the base station 110 is operating with a 10 decibel (dB) signal to noise ratio (SNR) using a modulation and coding scheme (MCS) of 10 and a maximum transmit power, packet loss will result if the UE 120 detects a drop of, for example, 5 dB due to pathloss. If the UE 120 continues to transmit using the same MCS (e.g., MCS 10), then packets will be lost until link adaptation can be performed by the base station 110 (e.g., by indicating a new MCS), which may take 500 milliseconds or more.

Some techniques and apparatuses described herein enable a UE 120 to autonomously modify one or more transmission parameters, other than a transmit power, for uplink communications after detecting a change in pathloss. The UE 120 may modify the one or more transmission parameters without receiving instructions from the base station 110 (e.g., in downlink control information (DCI)) with updated value(s) for the one or more transmission parameters. As a result, the UE 120 and the base station 110 avoid the round trip delay that would otherwise be required to modify the transmission parameter(s) and perform link adaptation.

For example, at 315 of FIG. 3, the UE 120 reduces an MCS used for an uplink communication to compensate for increased pathloss when the UE 120 cannot increase the transmit power (e.g., because the UE 120 is already transmitting using the maximum transmit power). Although MCS is shown as an example transmission parameter, other transmission parameters include a transport block size used for uplink communications, a resource allocation used for uplink communications, and/or the like. In this way, some techniques and apparatuses described herein may enable fast link adaptation and may reduce packet loss. Although some aspects are described herein in connection with a non-terrestrial network, such aspects can also be applied to a wireless network other than a non-terrestrial network to enable fast link adaptation and to reduce packet loss.

As indicated above, FIG. 3 is provided as an example. Other examples may differ from what is described with respect to FIG. 3.

Figure 4:
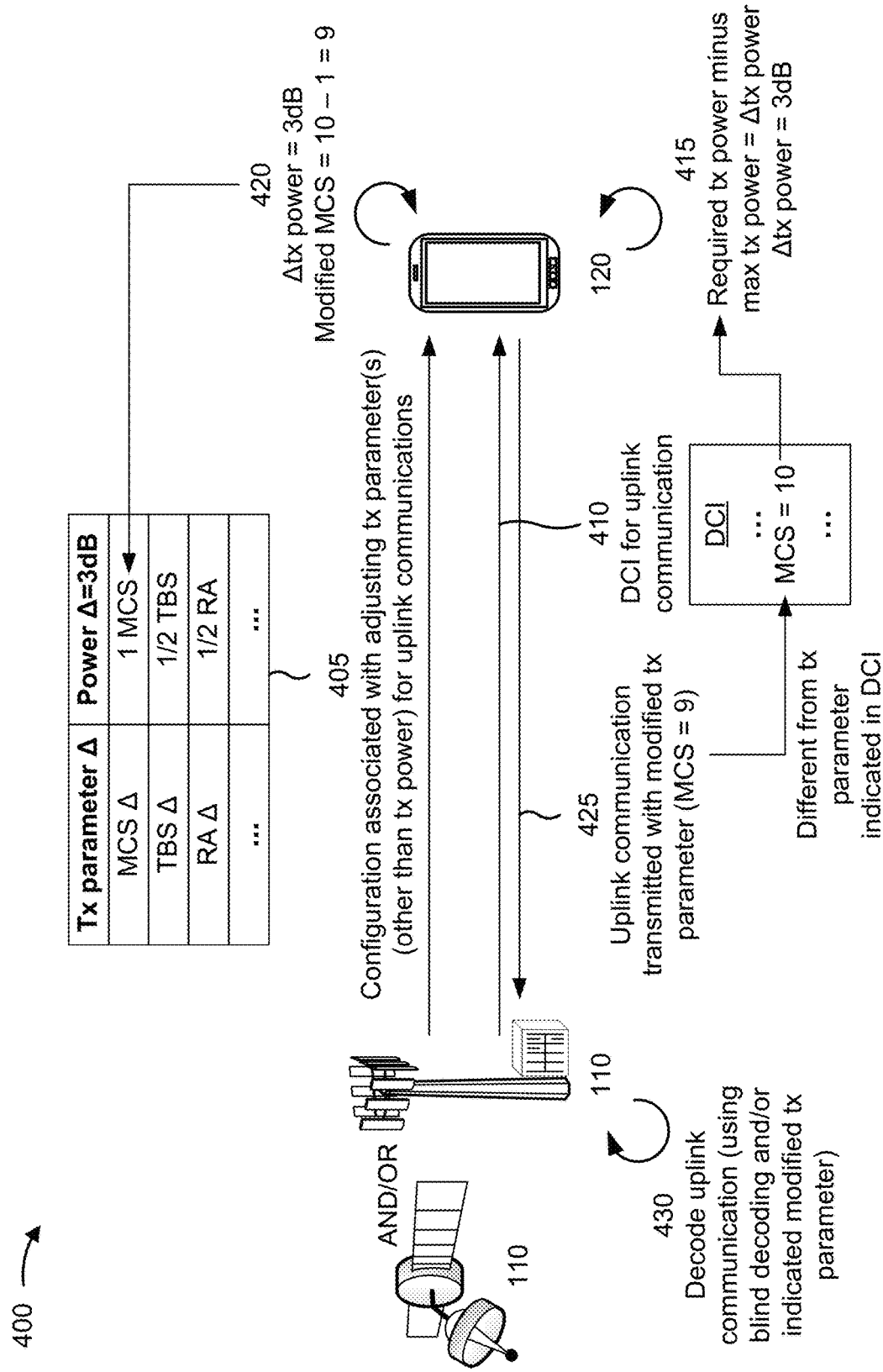

FIG. 4 is a diagram illustrating an example 400 of transmission parameter modification for uplink communications. As shown in FIG. 4, a UE 120 and a base station 110 may communicate with one another.

At 405, the base station 110 may transmit, to the UE 120, a configuration associated with modifying one or more transmission parameters, other than a transmit power, for uplink communications. The one or more transmission parameters may include, for example, an MCS for uplink communications, a transport block size for uplink communications, a resource allocation for uplink communications, and/or the like. The configuration may indicate a modification to be made to a transmission parameter, indicated in DCI that schedules an uplink communication, due to a change in channel conditions. Additionally, or alternatively, the configuration may indicate the change in channel conditions (e.g., to achieve a threshold SNR, to compensate for additional transmit power needed for the uplink communication, and/or the like) and a corresponding modification to the transmission parameter. In some aspects, the configuration may be indicated in a radio resource control (RRC) message, such as an RRC configuration message, an RRC reconfiguration message, and/or the like.

As shown in FIG. 4, the configuration may indicate a power delta (shown as Power Δ) and a corresponding set of transmission parameter deltas (shown as Tx parameter Δ). In example 400, the base station 110 indicates a power delta of 3 dB, which corresponds to an MCS delta of 1 MCS, a transport block size (TBS) delta of one half (½), and a resource allocation (RA) delta of one half (½). In some aspects, the set of transmission parameter deltas (e.g., one or more transmission parameter deltas) may include all of the transmission parameter deltas described herein (e.g., MCS, TBS, and RA). In some aspects, the set of transmission parameter deltas may include a single transmission parameter delta or a subset of the transmission parameter deltas described herein. In some aspects, the set of transmission parameter deltas may include one or more transmission parameter deltas for a transmission parameter other than MCS, TBS, and RA.

At 410, the base station 110 may transmit DCI to the UE 120. The DCI may schedule an uplink communication (e.g., a physical uplink shared channel (PUSCH) communication, a physical uplink control channel (PUCCH) communication, and/or the like). For example, the DCI may include an uplink grant that schedules the uplink communication. The DCI may indicate one or more transmission parameter values for the uplink communication, such as an MCS value for the uplink communication, a TBS value for the uplink communication, an RA value for the uplink communication, and/or the like. In example 400, the DCI indicates an MCS value of 10 (e.g., an MCS corresponding to an MCS index of 10).

At 415, the UE 120 may determine that a required transmit power (shown as required tx power) for the uplink communication scheduled by the DCI is greater than a maximum transmit power for the uplink communication (shown as max tx power). In some aspects, the UE 120 may determine the required transmit power based at least in part on the one or more transmission parameter values indicated in the DCI. For example, the UE 120 may be required to transmit at different transmit powers to support different modulation and coding schemes, different transport block sizes, different resource allocations, and/or the like (e.g., to achieve a required SNR, block error rate (BLER), and/or other performance parameter at the base station 110). Additionally, or alternatively, the UE 120 may determine the required transmit power based at least in part on a pathloss parameter measured by and/or determined by the UE 120, as described above in connection with FIG. 3. As also described above in connection with FIG. 3, the maximum transmit power may include a maximum allowed transmit power (e.g., defined in a wireless communication standard), a configured maximum output power $P_{CMAX}$, a configured maximum output power $P_{CMAX,f}$ for a carrier f, a configured maximum output power $P_{CMAX,c}$ for a cell c (e.g., a serving cell), a configured maximum output power $P_{CMAX,f,c}$ for a carrier f of a cell c, a maximum transmit power determined based at least in part on a maximum power reduction, and/or the like.

As further shown, the UE 120 may determine (e.g., calculate) a difference between the required transmit power and the maximum transmit power to identify a transmit power delta for the uplink communication. In some aspects, the UE 120 may calculate the transmit power delta by subtracting the maximum transmit power from the required transmit power. If the transmit power delta is negative or zero, this indicates that the UE 120 can transmit the uplink communication using the required transmit power without exceeding the maximum transmit power, which may not require modification to a transmission parameter other than the transmit power. If the transmit power delta is positive, this indicates that the UE 120 cannot transmit the uplink communication using the required transmit power because such transmission would exceed the maximum transmit power. In this case, the UE 120 may be capable of achieving a required SNR by modifying one or more transmission parameters, of an uplink communication, other than a transmit power. In example 400, the tx power delta (shown as Δtx power) is 3 dB.

At 420, the UE 120 may modify at least one transmission parameter, of the one or more transmission parameters indicated in the configuration, based at least in part on the configuration and based at least in part on determining that the required transmit power is greater than the maximum transmit power. In example 400, the UE 120 determines a tx power delta of 3 dB, and the configuration indicates that for every 3 dB of additional power needed for the uplink transmission (e.g., for every 3 dB that the required transmit power exceeds the maximum transmit power), the UE 120 may reduce the MCS by 1 (e.g., can reduce the MCS index by 1). For example, each reduction of the MCS by 1 (or each reduction in the TBS by one half, or each reduction of the RA by one half, and/or the like) can achieve a gain of 3 dB.

Additionally, or alternatively, the UE 120 may reduce the TBS to achieve a gain. In this case, the configuration may indicate a fixed size by which a TBS, indicated in the DCI, is to be reduced, may indicate a percentage or a fraction by which the TBS, indicated in the DCI, is to be reduced, and/or the like. Additionally, or alternatively, the UE 120 may reduce the resource allocation (e.g., the number of resources used for transmission of the uplink communication) to achieve a gain. In this case, the configuration may indicate a fixed size by which an RA, indicated in the DCI, is to be reduced, may indicate a percentage or a fraction by which the RA, indicated in the DCI, is to be reduced, and/or the like. In some aspects, the UE 120 may scale the TBS based at least in part on the reduction in the RA. In some aspects, the UE 120 may modify a single transmission parameter without modifying other transmission parameters indicated in DCI. In some aspects, the UE 120 may modify multiple transmission parameters. In some aspects, the configuration may indicate a single transmission parameter to be modified, a combination of transmission parameters to be modified, an order in which transmission parameters are to be modified to attempt to achieve a desired SNR, and/or the like.

The UE 120 may identify a transmission parameter delta based at least in part on the power delta indicated in the configuration and the tx power delta calculated by the UE 120. In example 400, the UE 120 identifies a transmission parameter delta of 1 MCS (or −1 MCS, indicating a reduction or downgrading in MCS) because the required transmit power exceeds the maximum transmit power by 3 dB and the configuration indicates that a reduction in MCS by 1 achieves a gain (e.g., a power delta) of 3 dB. As another example, if the required transmit power exceeds the maximum transmit power by more than 3 dB, up to 6 dB, then the UE 120 may identify a transmission parameter delta of 2 MCS. As another example, if the required transmit power exceeds the maximum transmit power by more than 6 dB, up to 9 dB, then the UE 120 may identify a transmission parameter delta of 3 MCS. As another example, if the required transmit power exceeds the maximum transmit power by less than 3 dB (e.g., from 0 dB to 3 dB), then the UE 120 may identify a transmission parameter delta of 0 MCS (e.g., and may not modify the indicated MCS).

The UE 120 may modify a transmission parameter value indicated in the DCI using the identified transmission parameter delta. In example 400, the DCI indicates an MCS of 10 and the UE identifies an MCS delta of 1. Thus, the UE 120 determines an MCS value of 9 for transmission of the uplink communication (e.g., by modifying the indicated MCS value of 10 by subtracting the transmission parameter delta of 1). The information shown in the configuration in FIG. 4 is shown as an example. In some aspects, the configuration may include different information that indicates conditions under which the UE 120 is to modify a transmission parameter, an amount by which the transmission parameter is to be modified, and/or the like, as described in more detail below in connection with FIGS. 5-7.

In some aspects, the UE 120 may modify the transmission parameter based at least in part on receiving a fallback transmission parameter activation signal from the base station 110. For example, the operations described herein with respect to determining that the required transmit power exceeds the maximum transmit power, modifying the transmission parameter, and transmitting the uplink communication using the modified transmission parameter may be referred to as a fallback transmission parameter procedure. The base station 110 may activate (e.g., enable) or deactivate (e.g., disable) the fallback transmission parameter procedure. For example, the fallback transmission parameter procedure may be deactivated by default, and the base station 110 may transmit a fallback transmission parameter activation signal to activate the fallback transmission parameter procedure. The base station 110 may transmit the fallback transmission parameter activation signal in DCI (e.g., using activation DCI, a physical downlink control channel (PDCCH) order, a field of DCI that indicates whether the fallback transmission parameter procedure is activated or deactivated for an uplink communication scheduled by the DCI, and/or the like), in an RRC message, in a medium access control (MAC) control element (CE) (MAC-CE), and/or the like.

Additionally, or alternatively, the UE 120 may perform the fallback transmission parameter procedure for only some types of uplink communications. In some aspects, the types of uplink communications for which the fallback transmission parameter procedure is activated may be indicated in the configuration, in an RRC message, in DCI, in a MAC-CE, and/or the like. In this case, the UE 120 may perform the fallback transmission parameter procedure based at least in part on determining that the uplink communication is a type of uplink communication for which the fallback transmission parameter procedure is enabled. For example, the fallback transmission parameter procedure may be enabled for only some hybrid automatic repeat request (HARQ) processes, for only PUSCH communications and not for PUCCH communications, for only semi-persistent scheduling (SPS) or configured grant (CG) PUSCH communications (and not for scheduled uplink (SUL) PUSCH communications), and/or the like. In some aspects, the configuration described herein may be indicated in an SPS configuration, such as when the configuration applies to SPS PUSCH communications.

At 425, the UE 120 may transmit the uplink communication (e.g., a PUSCH communication) to the base station 110 using the modified transmission parameter value (e.g., an MCS value of 9). As shown, the modified transmission parameter value (e.g., 9), for a transmission parameter (e.g., MCS), used by the UE 120 to transmit the uplink communication may be different from a transmission parameter value indicated in DCI (e.g., 10) for the transmission parameter. In some aspects, the modified transmission parameter value may result in a higher SNR at the base station 110, for the same transmit power (e.g., the maximum transmit power), as compared to the transmission parameter value indicated in the DCI.

In some cases, the modification of the transmission parameter may result in a different maximum transmit power permitted for the uplink communication. For example, modifying the MCS may result in a different maximum power reduction, which may result in a different maximum transmit power (e.g., $P_{CMAX}$). In some aspects, the UE 120 may use this different maximum transmit power (e.g., a modified maximum transmit power) to determine a transmission parameter value for the uplink communication. For example, the UE 120 may determine a difference between the required transmit power and the modified maximum transmit power (e.g., by subtracting the modified maximum transmit power from the required transmit power), and may identify a transmission parameter value (e.g., from the configuration) based at least in part on the difference (e.g., a modified tx power delta).

In some aspects, the UE 120 may transmit a power headroom report (PHR) based at least in part on modifying the transmission parameter and/or transmitting an uplink communication with a modified transmission parameter. In this case, the UE 120 may determine a PHR parameter based at least in part on modifying the transmission parameter and/or transmitting an uplink communication with a modified transmission parameter, and may transmit the PHR to the base station 110 to indicate the PHR parameter. In some aspects, the UE 120 may include the PHR in the uplink communication transmitted with the modified transmission parameter (or in a subsequent uplink communication if the UE 120 does not have sufficient processing time to include the PHR in the uplink communication transmitted with the modified transmission parameter).

At 430, the base station 110 may decode the uplink communication received from the UE 120. As described above, the uplink communication may be transmitted with a different transmission parameter value than a transmission parameter value indicated in DCI that schedules the uplink communication. In some aspects, the UE 120 may not indicate the modified transmission parameter value to the base station 110. In this case, the base station 110 may use blind decoding and/or hypothesis testing to test multiple transmission parameter values for the uplink communication. For example, in example 400, the base station 110 may test an MCS of 10, an MCS of 9, an MCS of 8, and/or the like.

Alternatively, in some aspects, the UE 120 may indicate the modified transmission parameter value to the base station 110. For example, the UE 120 may indicate the modified transmission parameter value in uplink control information (UCI) transmitted to the base station 110 (e.g., using one or more fields of the UCI). Additionally, or alternatively, the UE 120 may indicate the modified transmission parameter value by selecting a demodulation reference signal (DMRS) parameter based at least in part on the modified transmission parameter value. For example, the UE 120 may select a cyclic shift for a DMRS, a base sequence to be used to generate the DMRS, and/or the like, based at least in part on the modified transmission parameter value. In some aspects, a first set of (e.g., one or more) cyclic shifts and/or base sequences may correspond to a first transmission parameter value (or a first set of transmission parameter values that the base station 110 can test with blind decoding), a second set of (e.g., one or more) cyclic shifts and/or base sequences may correspond to a second transmission parameter value (or a second set of transmission parameter values that the base station 110 can test with blind decoding), and so on. In some aspects, the UE 120 may indicate a set of transmission parameter values in the UCI and/or using the selected DMRS parameter, and the base station 110 may test that set of transmission parameter values when performing blind decoding of the uplink communication.

In some aspects, the UE 120 may perform one or more operations described herein in connection with FIG. 4 (e.g., modifying a transmission parameter value) for an initial transmission of the uplink communication. For a retransmission of the initial transmission, the UE 120 may use the same transmission parameter value that was used for the initial transmission. For example, the UE 120 may determine whether the uplink communication is an initial transmission or a retransmission (e.g., based at least in part on a value of a new data indicator bit of DCI, based at least in part on a HARQ process identifier, and/or the like), and may selectively modify a transmission parameter (e.g., other than a transmit power) based at least in part on the determination. If the uplink communication is an initial transmission (and the required transmit power is greater than the maximum transmit power), then the UE 120 may modify the transmission parameter. If the uplink communication is a retransmission (and the required transmit power is greater than the maximum transmit power), then the UE 120 may use the same transmission parameter that was used for the initial transmission. If the UE 120 used a modified transmission parameter for the initial transmission, then the UE 120 may use that same modified transmission parameter for the retransmission. This may permit the base station 110 to decode the uplink communication by performing combining (e.g., of redundancy versions) of the initial transmission and the retransmission, thereby increasing the likelihood of successfully decoding the uplink communication.

Alternatively, in some aspects, the UE 120 may use the same TBS for a retransmission that was used in the initial transmission, but may reduce the MCS for the retransmission as compared to the initial transmission (e.g., using the operations described herein). In this way, the UE 120 may increase a robustness of the retransmission for combining.

By enabling the UE 120 to modify one or more transmission parameters, other than a transmit power, for uplink communications after detecting a change in pathloss, the UE 120 may avoid a round trip delay that would otherwise be required to modify the transmission parameter(s) and perform link adaptation. In this way, some techniques and apparatuses described herein may enable fast link adaptation and may reduce packet loss.

As indicated above, FIG. 4 is provided as an example. Other examples may differ from what is described with respect to FIG. 4.

FIG. 5 is a diagram illustrating an example 500 of transmission parameter modification for uplink communications. Example 500 is an example of information that may be included in the configuration associated with modifying one or more transmission parameters, other than a transmit power, for uplink communications, as described in connection with FIG. 4.

As shown in FIG. 5, in some aspects, the configuration may indicate one or more absolute power levels (shown as sensitivity/power level) required by a base station 110 and a corresponding one or more fallback transmission parameter values. The one or more fallback transmission parameter values are shown as MCS values in FIG. 5, but other fallback transmission parameter values may be used, such as TBS values, RA values, and/or the like.

In some aspects, the UE 120 may identify a fallback transmission parameter value, of the one or more fallback transmission parameter values, based at least in part on the one or more absolute power levels and a power level estimated by the UE for the uplink communication. The UE 120 may modify a transmission parameter, as described in connection with FIG. 4, by using the fallback transmission parameter value instead of a transmission parameter value indicated in DCI. The absolute power level may indicate a power level and/or a sensitivity corresponding to an SNR required by the base station 110 to decode uplink communications (e.g., transmitted with a particular MCS value, TBS, RA, and/or the like). The absolute power level may account for an internal configuration of the base station 110, such as hardware components of the base station 110, thermal noise at the base station 110, internal loss at the base station 110, and/or the like.

The UE 120 may determine (e.g., estimate) a power level at the base station 110 (e.g., a base station receive power) based at least in part on a pathloss measured by the UE 120. The UE 120 may compare the estimated power level to the indicated absolute power levels to determine a transmission parameter value to be used for the uplink communication.

For example, in example 500, a fallback MCS value of 0 (e.g., representing MCS index 0) corresponds to a power level of −130 decibel milliwatts (dBm) per Hertz (Hz), a fallback MCS value of 6 (e.g., representing MCS index 6) corresponds to a power level of −120 dBm/Hz, and a fallback MCS value of 10 (e.g., representing MCS index 10) corresponds to a power level of −110 dBm/Hz. If the UE 120 estimates a power level at the base station 110 of −115 dBm/Hz based at least in part on pathloss, then the UE 120 may select MCS 6 because the UE 120 is unable to achieve a power level of −110 dBm/Hz needed for MCS 10, but is able to achieve a power level of −120 dBm/Hz need for MCS 6 (e.g., due to the estimate of −115 dBm/Hz, which exceeds −120 dBm/Hz).

In some aspects, the UE 120 may select MCS 6 for the uplink communication regardless of an MCS indicated in DCI. However, in some aspects, the table shown in FIG. 6 may correspond to a specific MCS value indicated in DCI. In this case, different MCS values in DCI may correspond to different tables with different fallback MCS values. In some aspects, the UE 120 may identify a table (e.g., that indicates one or more absolute power levels and a corresponding one or more fallback MCS values) based at least in part on the MCS value indicated in DCI. The UE 120 may then use the identified table to select an MCS value for the uplink communication, as described above.

As indicated above, FIG. 5 is provided as an example. Other examples may differ from what is described with respect to FIG. 5. Although FIG. 5 uses MCS as an example, similar examples apply to TBS, RA, and/or the like.

Figure 6:
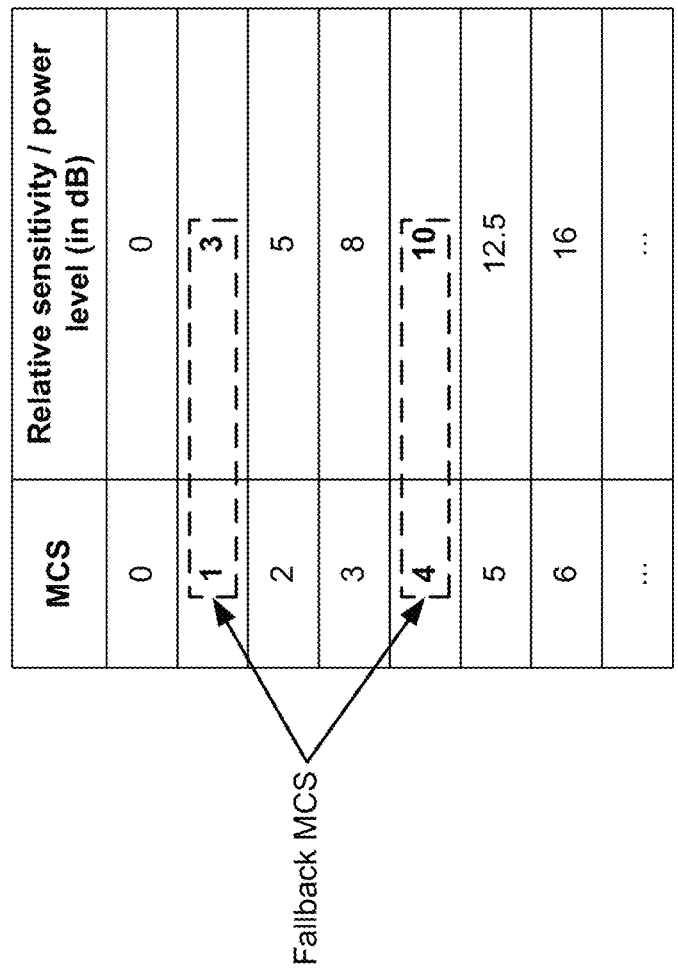

FIG. 6 is a diagram illustrating an example 600 of transmission parameter modification for uplink communications. Example 600 is an example of information that may be included in the configuration associated with modifying one or more transmission parameters, other than a transmit power, for uplink communications, as described in connection with FIG. 4.

As shown in FIG. 6, in some aspects, the configuration may indicate one or more relative power levels (shown as relative sensitivity/power level) associated with a base station 110 and a corresponding one or more fallback transmission parameter values. The one or more fallback transmission parameter values are shown as MCS values in FIG. 6, but other fallback transmission parameter values may be used, such as TBS values, RA values, and/or the like. In some aspects, the relative power levels and the corresponding one or more fallback transmission parameter values may be fixed according to a wireless communication standard (e.g., rather than being indicated by the base station 110 in a configuration).

In some aspects, the UE 120 may identify a fallback transmission parameter value, of the one or more fallback transmission parameter values, based at least in part on the one or more relative power levels and a difference between the required transmit power and the maximum transmit power. The UE 120 may modify a transmission parameter, as described in connection with FIG. 4, by using the fallback transmission parameter value instead of a transmission parameter value indicated in DCI.

In example 600, an MCS value of 0 (e.g., representing MCS index 0) corresponds to a relative power level of 0 dB, an MCS value of 1 corresponds to a relative power level of 3 dB, an MCS value of 2 corresponds to a relative power level of 5 dB, an MCS value of 3 corresponds to a relative power level of 8 dB, an MCS value of 4 corresponds to a relative power level of 10 dB, an MCS value of 5 corresponds to a relative power level of 12.5 dB, an MCS value of 6 corresponds to a relative power level of 16 dB, and so on.

As an example, the base station 110 may indicate an MCS value of 5 in DCI for an uplink communication. The MCS value of 5 corresponds to a relative power level of 12.5 dB. The UE 120 may calculate a transmit power delta (e.g., a difference between a required transmit power and a maximum transmit power, as described above in connection with FIG. 4) of 6 dB. In this case, the UE 120 may calculate a difference between the power level for the indicated MCS value (e.g., 12.5 dB) and the transmit power delta (e.g., 6 dB), for a difference of 6.5 dB. The UE 120 may select an MCS value for which a corresponding power level is satisfied by the difference, such as MCS 2, which has a corresponding power level of 5 dB, which is satisfied by the power level of 6.5 dB. In some aspects, the UE 120 may select the highest or best MCS value for which the corresponding power level is satisfied.

In some aspects, only a subset of the indicated transmission parameter values (e.g., MCS values) may be used for a fallback transmission parameter procedure. In this case, the configuration may indicate the fallback transmission parameter values, which may be a subset of the indicated transmission parameter values and corresponding power levels. In example 600, the configuration may indicate that MCS 1 and MCS 4 are the fallback MCS values. Using the example above, in this case, the UE 120 may select MCS 1 rather than MCS 2 because MCS 1 is indicated as a fallback MCS value and MCS 2 is not a fallback MCS value. By using a subset of transmission parameter values as fallback transmission parameter values, the base station 110 may reduce signaling overhead (e.g., for the UE 120 to signal a transmission parameter used by the UE 120 for the uplink communication) and/or may reduce complexity of blind decoding (e.g., because the base station 110 need not test as many hypotheses).

In some aspects, after modifying the transmission parameter value, the UE 120 may not need to transmit the uplink communication using a required transmit power determined based at least in part on a transmission parameter value indicated in DCI (e.g., because the UE 120 is not using the transmission parameter value indicated in DCI). In this case, the UE 120 may determine a modified transmit power based at least in part on the modified transmission parameter value, and may transmit the uplink communication using the modified transmit power. For example, the UE may be short by 6 dB of power, as described in the example above, when the required transmit power, based on an indicated MCS value of 5, is 29 dBm and the maximum transmit power is 23 dBm. As described above, the UE 120 may fall back to an MCS value of 1, which corresponds to a relative power level of 3 dB. The difference between the relative power level for MCS 5 (e.g., 12.5 dB), and the relative power level for MCS 1 (e.g., 3 dB) is 9.5 dB. In this case, the required transmit power is 29 dBm minus 9.5 dBm, or 19.5 dBm. In this case, the UE 120 may transmit the uplink communication with a transmit power of 19.5 dBm instead of 23 dBm, thereby conserving UE battery power.

As indicated above, FIG. 6 is provided as an example. Other examples may differ from what is described with respect to FIG. 6. Although FIG. 6 uses MCS as an example, similar examples apply to TBS, RA, and/or the like.

Figure 7:
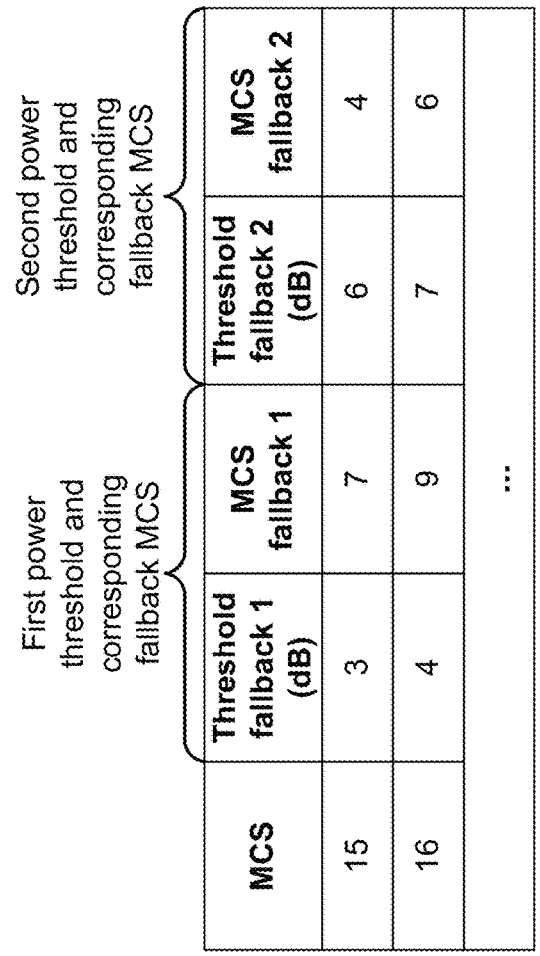

FIG. 7 is a diagram illustrating an example 700 of transmission parameter modification for uplink communications. Example 700 is an example of information that may be included in the configuration associated with modifying one or more transmission parameters, other than a transmit power, for uplink communications, as described in connection with FIG. 4.

As shown in FIG. 7, in some aspects, the configuration may indicate, for each transmission parameter value of a set of transmission parameter values, one or more power thresholds (e.g., relative power level threshold) and a corresponding one or more fallback transmission parameter values. The one or more fallback transmission parameter values are shown as MCS values in FIG. 7, but other fallback transmission parameter values may be used, such as TBS values, RA values, and/or the like. In some aspects, the one or more power thresholds and the corresponding one or more fallback transmission parameter values may be fixed according to a wireless communication standard (e.g., rather than being indicated by the base station 110 in a configuration).

In some aspects, the UE 120 may identify a fallback transmission parameter value, of the one or more fallback transmission parameter values, based at least in part on the one or more power thresholds and a difference between the required transmit power and the maximum transmit power. The UE 120 may modify a transmission parameter, as described in connection with FIG. 4, by using the fallback transmission parameter value instead of a transmission parameter value indicated in DCI.

In example 700, an MCS value of 15 (e.g., representing MCS index 15) is associated with a first power threshold of 3 dB and a corresponding MCS fallback value of 7, is associated with a second power threshold of 6 dB and a corresponding MCS fallback value of 4, and so on. Similarly, an MCS value of 16 (e.g., representing MCS index 16) is associated with a first power threshold of 4 dB and a corresponding MCS fallback value of 9, is associated with a second power threshold of 7 dB and a corresponding MCS fallback value of 6, and so on. Although the power thresholds are shown as being different for different MCS values indicated in DCI, in some aspects, the same power threshold may be used across multiple (e.g., all) MCS values.

As an example, the base station 110 may indicate an MCS value of 16 in DCI for an uplink communication. If the UE 120 is short of transmit power by less than the first power threshold of 4 dB (e.g., if a difference between a required transmit power and a maximum transmit power is less than 4 dB), then the UE 120 may transmit the uplink communication using an MCS of 16. If the UE 120 is short of transmit power by at least 4 dB (e.g., the first power threshold) but less than 7 dB (e.g., the second power threshold), then the UE 120 may transmit the uplink communication using an MCS of 9 (e.g., the first fallback MCS). If the UE 120 is short of transmit power by 7 dB (e.g., the second power threshold) or more, then the UE 120 may transmit the uplink communication using an MCS of 6 (e.g., the second fallback MCS). In this way, the base station 110 may have flexibility to configure different sets of fallback MCS and power thresholds for different indicated MCS values.

As indicated above, FIG. 7 is provided as an example. Other examples may differ from what is described with respect to FIG. 7. Although FIG. 7 uses MCS as an example, similar examples apply to TBS, RA, and/or the like.

Figure 8:
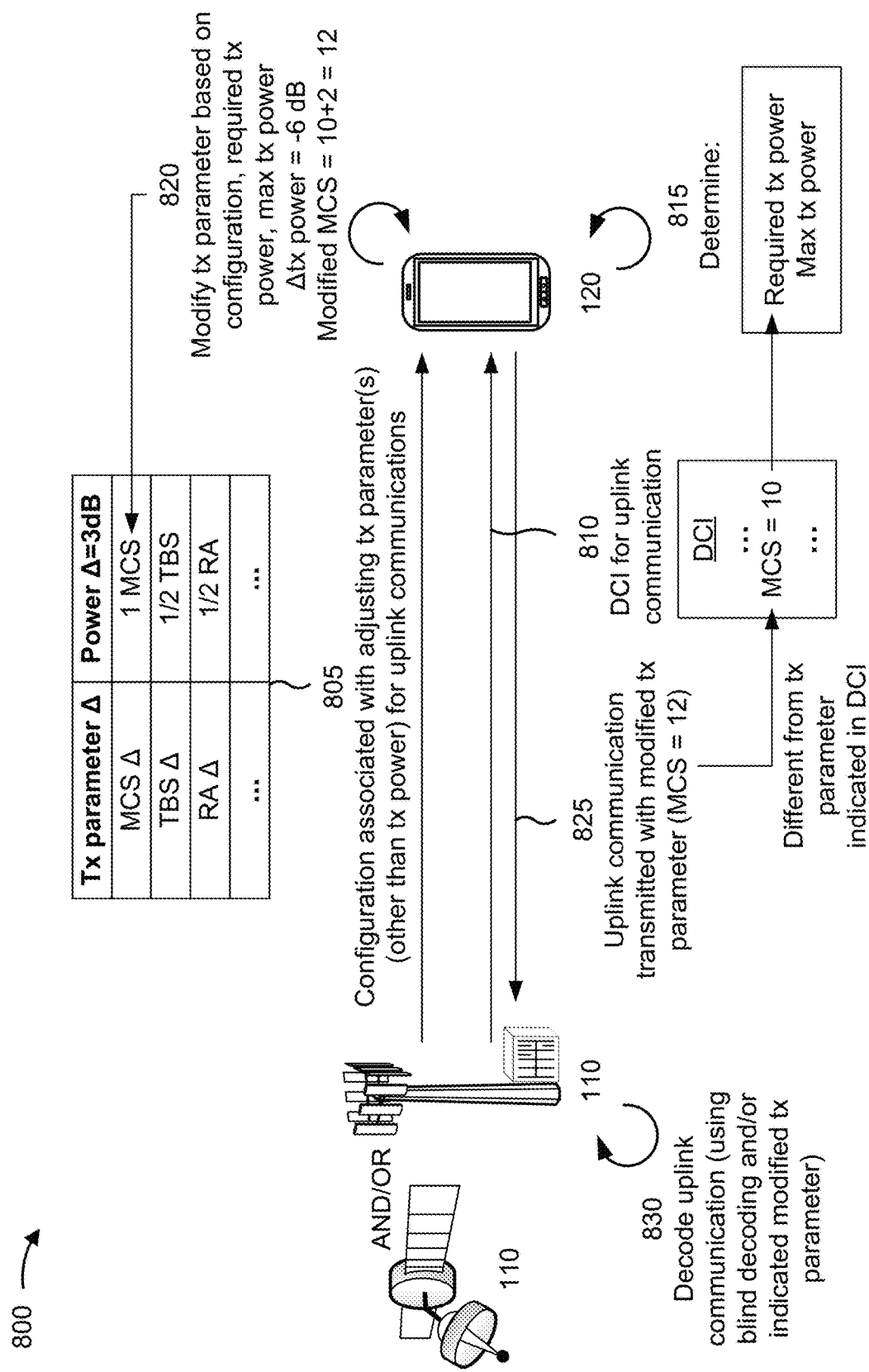

FIG. 8 is a diagram illustrating an example 800 of transmission parameter modification for uplink communications. Example 800 of FIG. 8 is similar to example 600 of FIG. 6, except that example 600 focuses on a scenario where the UE 120 detects an increase in pathloss, and a required transmit power is greater than a maximum transmit power. As a result, the UE 120 reduces a transmission parameter value to achieve a higher SNR or a higher power level at the base station 110. In example 800, the UE 120 may detect a decrease in pathloss, and the UE 120 may increase a transmission parameter value to achieve higher throughput, rather than (or in addition to) reducing a transmit power.

At 805, the base station 110 may transmit, to the UE 120, a configuration associated with modifying one or more transmission parameters, other than a transmit power, for uplink communications, as described above in connection with FIG. 4. The configuration may include information described above in connection with one or more of FIGS. 4-7.

At 810, the base station 110 may transmit DCI to the UE 120. The DCI may schedule an uplink communication, as described above in connection with FIG. 4. The DCI may indicate one or more transmission parameter values for the uplink communication, such as an MCS value for the uplink communication, a TBS value for the uplink communication, an RA value for the uplink communication, and/or the like. In example 800, the DCI indicates an MCS value of 10 (e.g., an MCS corresponding to an MCS index of 10).

At 815, the UE 120 may determine a required transmit power (shown as required tx power) for the uplink communication scheduled by the DCI. The UE 120 may also determine a maximum transmit power for the uplink communication (shown as max tx power). In some aspects, the UE 120 may determine the required transmit power based at least in part on the one or more transmission parameter values indicated in the DCI and/or based at least in part on a pathloss parameter, as described above in connection with FIG. 4. As described above in connection with FIG. 3, the maximum transmit power may include a maximum allowed transmit power (e.g., defined in a wireless communication standard), a configured maximum output power $P_{CMAX}$, a configured maximum output power $P_{CMAX,f}$ for a carrier f, a configured maximum output power $P_{CMAX,c}$ for a cell c (e.g., a serving cell), a configured maximum output power $P_{CMAX,f,c}$ for a carrier f of a cell c, a maximum transmit power determined based at least in part on a maximum power reduction, and/or the like.

In some aspects, the UE 120 may determine the maximum transmit power for the uplink communication based at least in part on DCI that schedules the uplink communication. For example, the UE 120 may derive the maximum transmit power from one or more values in one or more fields of the DCI. Additionally, or alternatively, the UE 120 may determine the maximum transmit power for the uplink communication based at least in part on a transmit power used for a prior uplink communication (e.g., that occurs within a threshold number of slots of the uplink communication). In some aspects, the UE 120 may determine the maximum transmit power of the uplink communication as a global maximum transmit power, such as $P_{CMAX}$.

At 820, the UE 120 may modify a transmission parameter, of the one or more transmission parameters indicated in the configuration, based at least in part on the configuration, the required transmit power, and the maximum transmit power. In example 800, the UE 120 determines a tx power delta of −6 dB. The configuration indicates that for every 3 dB of additional power needed for the uplink transmission (e.g., for every 3 dB that the required transmit power exceeds the maximum transmit power), the UE 120 may reduce the MCS by 1 (e.g., can reduce the MCS index by 1). The configuration also indicates that for every 3 dB of power reduction that can be performed for the uplink transmission (e.g., for every 3 dB that the maximum transmit power exceeds the required transmit power), the UE 120 may increase the MCS by 1 (e.g., can increase the MCS index by 1). For example, each available 3 dB of power headroom can be used to increase the MCS by 1 (or to double the TBS, or to double the RA, and/or the like). In example 800, the UE 120 can increase the indicated MCS value of 10 by 2, to transmit the uplink communication with an MCS value of 12 (e.g., with a corresponding increase in the transmit power of the uplink communication), thereby improving spectral efficiency.

At 825, the UE 120 may transmit the uplink communication (e.g., a PUSCH communication) to the base station 110 using the modified transmission parameter value (e.g., an MCS value of 12). As shown, the modified transmission parameter value (e.g., 12), for a transmission parameter (e.g., MCS), used by the UE 120 to transmit the uplink communication may be different from a transmission parameter value indicated in DCI (e.g., 10) for the transmission parameter. In some aspects, the modified transmission parameter value may result in a lower SNR at the base station 110, for the same transmit power, as compared to the transmission parameter value indicated in the DCI. In some aspects, the UE 120 may increase the transmit power of the uplink communication to compensate for the lower SNR (e.g., to achieve SNR at a required level at the base station 110). In this way, the UE 120 may increase throughput, achieve higher spectral efficiency, and/or the like.

As indicated above, FIG. 8 is provided as an example. Other examples may differ from what is described with respect to FIG. 8.

Figure 9:
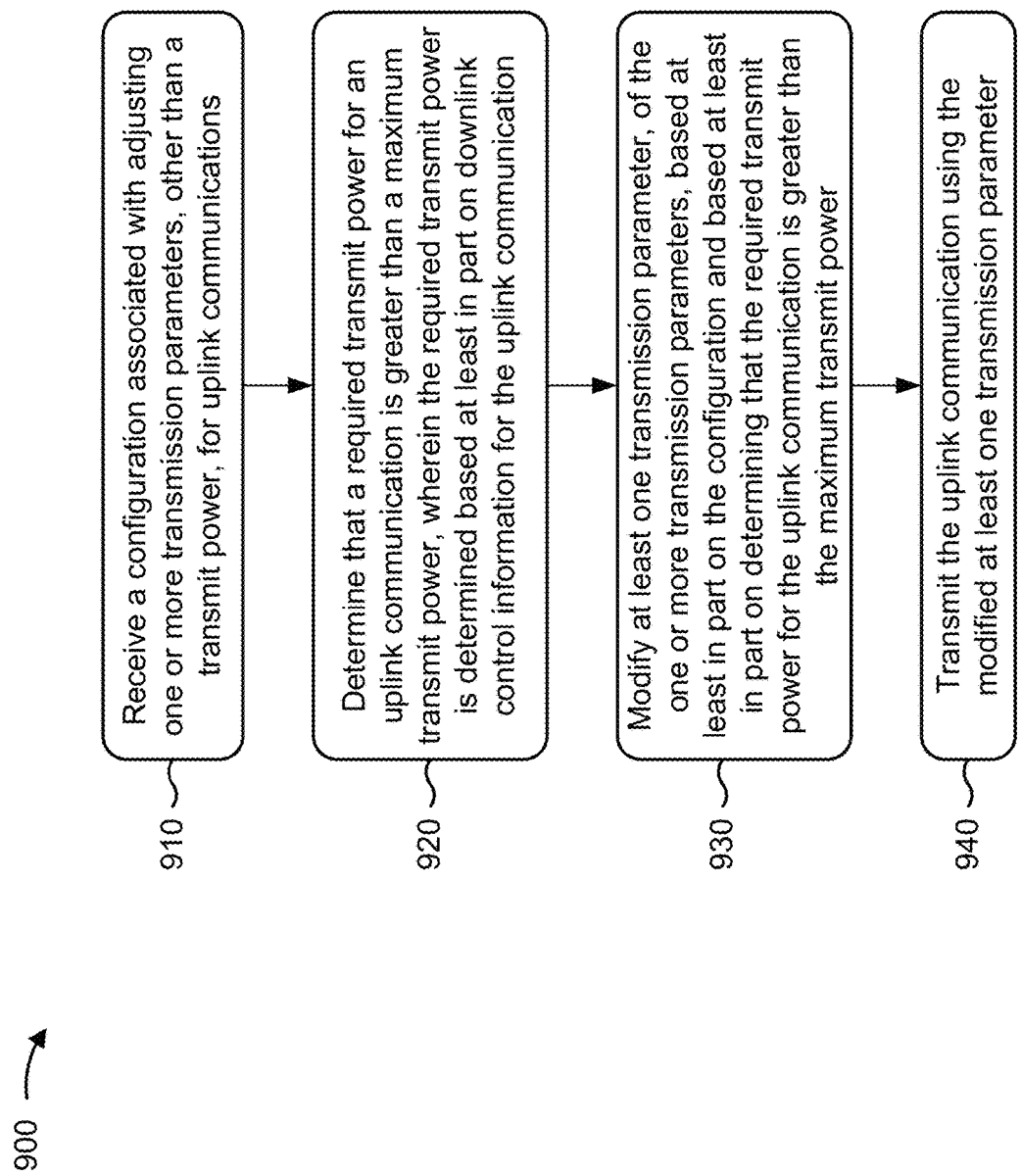
FIGS. 9-11 are flowcharts of a method of wireless communication.

FIG. 9 is a flowchart of a method 900 of wireless communication. The method may be performed by a UE (e.g., UE 120, apparatus 1202, apparatus 1305, and/or the like).

At 910, the UE may receive a configuration associated with modifying one or more transmission parameters, other than a transmit power, for uplink communications. For example, the UE (e.g., using receive processor 258, controller/processor 280, memory 282, and/or the like) may receive a configuration associated with modifying one or more transmission parameters, other than a transmit power, for uplink communications, as described above. In some aspects, the at least one transmission parameter includes at least one of: a modulation and coding scheme used for the uplink communication, a transport block size used for the uplink communication, a resource allocation used for the uplink communication, or a combination thereof. In some aspects, the configuration is included in an RRC message.

At 920, the UE may determine that a required transmit power for an uplink communication is greater than a maximum transmit power, wherein the required transmit power is determined based at least in part on downlink control information for the uplink communication. For example, the UE (e.g., using receive processor 258, transmit processor 264, controller/processor 280, memory 282, and/or the like) may determine that a required transmit power for an uplink communication is greater than a maximum transmit power, as described above. In some aspects, the required transmit power is determined based at least in part on downlink control information for the uplink communication. Additionally, or alternatively, the required transmit power may be determined based at least in part on a pathloss parameter measured by the UE.

At 930, the UE may modify at least one transmission parameter, of the one or more transmission parameters, based at least in part on the configuration and based at least in part on determining that the required transmit power for the uplink communication is greater than the maximum transmit power. For example, the UE (e.g., using transmit processor 264, controller/processor 280, memory 282, and/ or the like) may modify at least one transmission parameter, of the one or more transmission parameters, based at least in part on the configuration and based at least in part on determining that the required transmit power for the uplink communication is greater than the maximum transmit power, as described above.

At 940, the UE may transmit the uplink communication using the modified at least one transmission parameter. For example, the UE (e.g., using transmit processor 264, controller/processor 280, memory 282, and/or the like) may transmit the uplink communication using the modified at least one transmission parameter, as described above. In some aspects, the uplink communication may include a PUSCH communication.

Method 900 may include additional aspects, such as any single aspect or any combination of aspects described below and/or in connection with one or more other processes described elsewhere herein.

In a first aspect, the at least one transmission parameter includes at least one of: a modulation and coding scheme used for the uplink communication, a transport block size used for the uplink communication, a resource allocation used for the uplink communication, or a combination thereof.

In a second aspect, alone or in combination with the first aspect, the required transmit power is determined based at least in part on a pathloss parameter measured by the UE.

In a third aspect, alone or in combination with one or more of the first and second aspects, the configuration indicates a power delta and a corresponding one or more transmission parameter deltas.

In a fourth aspect, alone or in combination with one or more of the first through third aspects, method 900 includes identifying a transmission parameter delta, of the one or more transmission parameter deltas, based at least in part on the power delta and a difference between the required transmit power and the maximum transmit power; and modifying the at least one transmission parameter by applying the transmission parameter delta to a transmission parameter value indicated in the downlink control information.

In a fifth aspect, alone or in combination with one or more of the first through fourth aspects, the configuration indicates one or more absolute power levels required by a base station and a corresponding one or more fallback transmission parameter values.

In a sixth aspect, alone or in combination with one or more of the first through fifth aspects, method 900 includes identifying a fallback transmission parameter value, of the one or more fallback transmission parameter values, based at least in part on the one or more absolute power levels and a power level estimated by the UE for the uplink communication; and modifying the at least one transmission parameter by using the fallback transmission parameter value instead of a transmission parameter value indicated in the downlink control information.

In a seventh aspect, alone or in combination with one or more of the first through sixth aspects, the configuration indicates one or more relative power levels associated with a base station and a corresponding one or more fallback transmission parameter values.

In an eighth aspect, alone or in combination with one or more of the first through seventh aspects, method 900 includes identifying a fallback transmission parameter value, of the one or more fallback transmission parameter values, based at least in part on the one or more relative power levels and a difference between the required transmit power and the maximum transmit power; and modifying the at least one transmission parameter by using the fallback transmission parameter value instead of a transmission parameter value indicated in the downlink control information.

In a ninth aspect, alone or in combination with one or more of the first through eighth aspects, the one or more relative power levels are a subset of a set of relative power levels indicated in the configuration, the corresponding one or more fallback transmission parameter values are a subset of a set of transmission parameter values indicated in the configuration, and the set of relative power levels corresponds to the set of transmission parameter values.

In a tenth aspect, alone or in combination with one or more of the first through ninth aspects, the configuration indicates, for each transmission parameter value of a set of transmission parameter values, one or more power thresholds and a corresponding one or more fallback transmission parameter values.

In an eleventh aspect, alone or in combination with one or more of the first through tenth aspects, method 900 includes identifying a fallback transmission parameter value, of the one or more fallback transmission parameter values, based at least in part on the one or more power thresholds and a difference between the required transmit power and the maximum transmit power; and modifying the at least one transmission parameter by using the fallback transmission parameter value instead of a transmission parameter value indicated in the downlink control information.

In a twelfth aspect, alone or in combination with one or more of the first through eleventh aspects, the uplink communication is transmitted with a transmit power that is determined based at least in part on the modified at least one transmission parameter.

In a thirteenth aspect, alone or in combination with one or more of the first through twelfth aspects, the modified at least one transmission parameter is not signaled to a base station.

In a fourteenth aspect, alone or in combination with one or more of the first through thirteenth aspects, method 900 includes transmitting a demodulation reference signal using a demodulation reference signal parameter that is selected based at least in part on the modified at least one transmission parameter.

In a fifteenth aspect, alone or in combination with one or more of the first through fourteenth aspects, method 900 includes transmitting an indication of the modified at least one transmission parameter in uplink control information.

In a sixteenth aspect, alone or in combination with one or more of the first through fifteenth aspects, the uplink communication is an initial transmission.

In a seventeenth aspect, alone or in combination with one or more of the first through sixteenth aspects, method 900 includes transmitting a retransmission of the initial transmission using a same transmission parameter as the initial transmission.

In an eighteenth aspect, alone or in combination with one or more of the first through seventeenth aspects, method 900 includes determining whether the uplink communication is an initial transmission or a retransmission; and modifying the at least one transmission parameter is based at least in part on determining whether the uplink communication is an initial transmission or a retransmission, wherein the at least one transmission parameter is modified if the uplink communication is determined to be an initial uplink transmission, or wherein the same transmission parameter that is used for the initial transmission is also used for the retransmission if the uplink communication is determined to be a retransmission.

In a nineteenth aspect, alone or in combination with one or more of the first through eighteenth aspects, the at least one transmission parameter is modified based at least in part on at least one of: a fallback transmission parameter activation signal received from a base station, a determination that the uplink communication is a type of uplink communication for which a fallback transmission parameter procedure is enabled, or a combination thereof.

In a twentieth aspect, alone or in combination with one or more of the first through nineteenth aspects, method 900 includes transmitting a power headroom report based at least in part on modifying the at least one transmission parameter.

In a twenty-first aspect, alone or in combination with one or more of the first through twentieth aspects, the at least one transmission parameter is modified based at least in part on a modified maximum transmit power associated with the modified at least one transmission parameter, wherein the modified maximum transmit power is different from the maximum transmit power.

Although FIG. 9 shows example blocks of method 900, in some aspects, method 900 may include additional blocks, fewer blocks, different blocks, or differently arranged blocks than those depicted in FIG. 9. Additionally, or alternatively, two or more of the blocks of method 900 may be performed in parallel.

Figure 10:
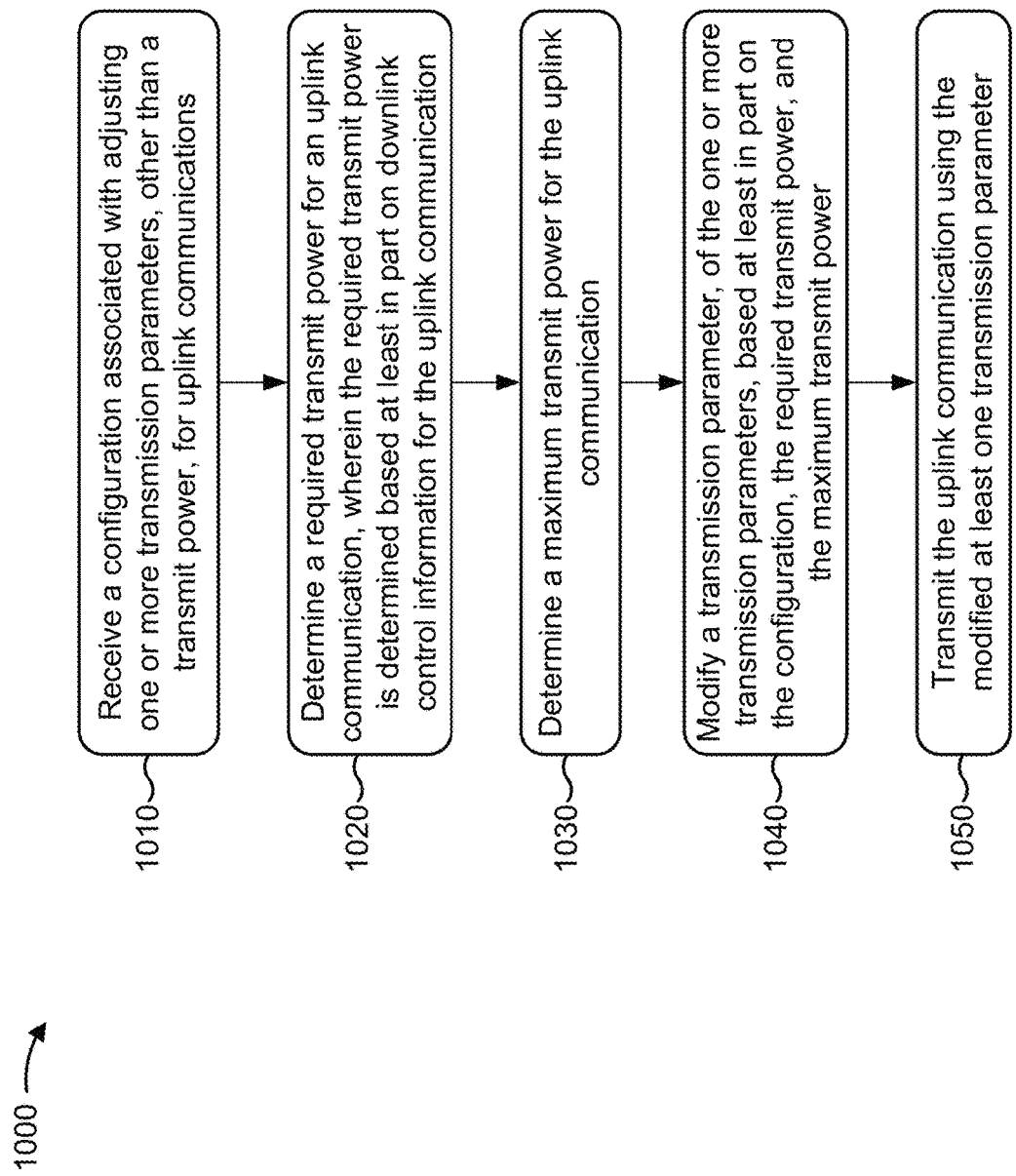

FIG. 10 is a flowchart of a method 1000 of wireless communication. The method may be performed by a UE (e.g., UE 120, apparatus 1202, apparatus 1305, and/or the like).

At 1010, the UE may receive a configuration associated with modifying one or more transmission parameters, other than a transmit power, for uplink communications. For example, the UE (e.g., using receive processor 258, controller/processor 280, memory 282, and/or the like) may receive a configuration associated with modifying one or more transmission parameters, other than a transmit power, for uplink communications, as described above. In some aspects, the at least one transmission parameter includes at least one of: a modulation and coding scheme used for the uplink communication, a transport block size used for the uplink communication, a resource allocation used for the uplink communication, or a combination thereof. In some aspects, the configuration is included in an RRC message.

At 1020, the UE may determine a required transmit power for an uplink communication, wherein the required transmit power is determined based at least in part on downlink control information for the uplink communication. For example, the UE (e.g., using receive processor 258, transmit processor 264, controller/processor 280, memory 282, and/or the like) may determine a required transmit power for an uplink communication, as described above. In some aspects, the required transmit power is determined based at least in part on downlink control information for the uplink communication. Additionally, or alternatively, the required transmit power may be determined based at least in part on a pathloss parameter measured by the UE.

At 1030, the UE may determine a maximum transmit power for the uplink communication. For example, the UE (e.g., using receive processor 258, transmit processor 264, controller/processor 280, memory 282, and/or the like) may determine a maximum transmit power for the uplink communication, as described above. In some aspects, the maximum transmit power for the uplink communication is determined based at least in part on at least one of: the downlink control information, a transmit power used for a prior uplink communication that precedes the uplink communication, a global maximum transmit power, or a combination thereof.

At 1040, the UE may modify a transmission parameter, of the one or more transmission parameters, based at least in part on the configuration, the required transmit power, and the maximum transmit power. For example, the UE (e.g., using transmit processor 264, controller/processor 280, memory 282, and/or the like) may modify a transmission parameter, of the one or more transmission parameters, based at least in part on the configuration, the required transmit power, and the maximum transmit power, as described above.

At 1050, the UE may transmit the uplink communication using the modified transmission parameter. For example, the UE (e.g., using transmit processor 264, controller/processor 280, memory 282, and/or the like) may transmit the uplink communication using the modified transmission parameter, as described above. In some aspects, the uplink communication is a PUSCH communication.

Method 1000 may include additional aspects, such as any single aspect or any combination of aspects described in connection with one or more other processes described elsewhere herein.

Although FIG. 10 shows example blocks of method 1000, in some aspects, method 1000 may include additional blocks, fewer blocks, different blocks, or differently arranged blocks than those depicted in FIG. 10. Additionally, or alternatively, two or more of the blocks of method 1000 may be performed in parallel.

Figure 11:
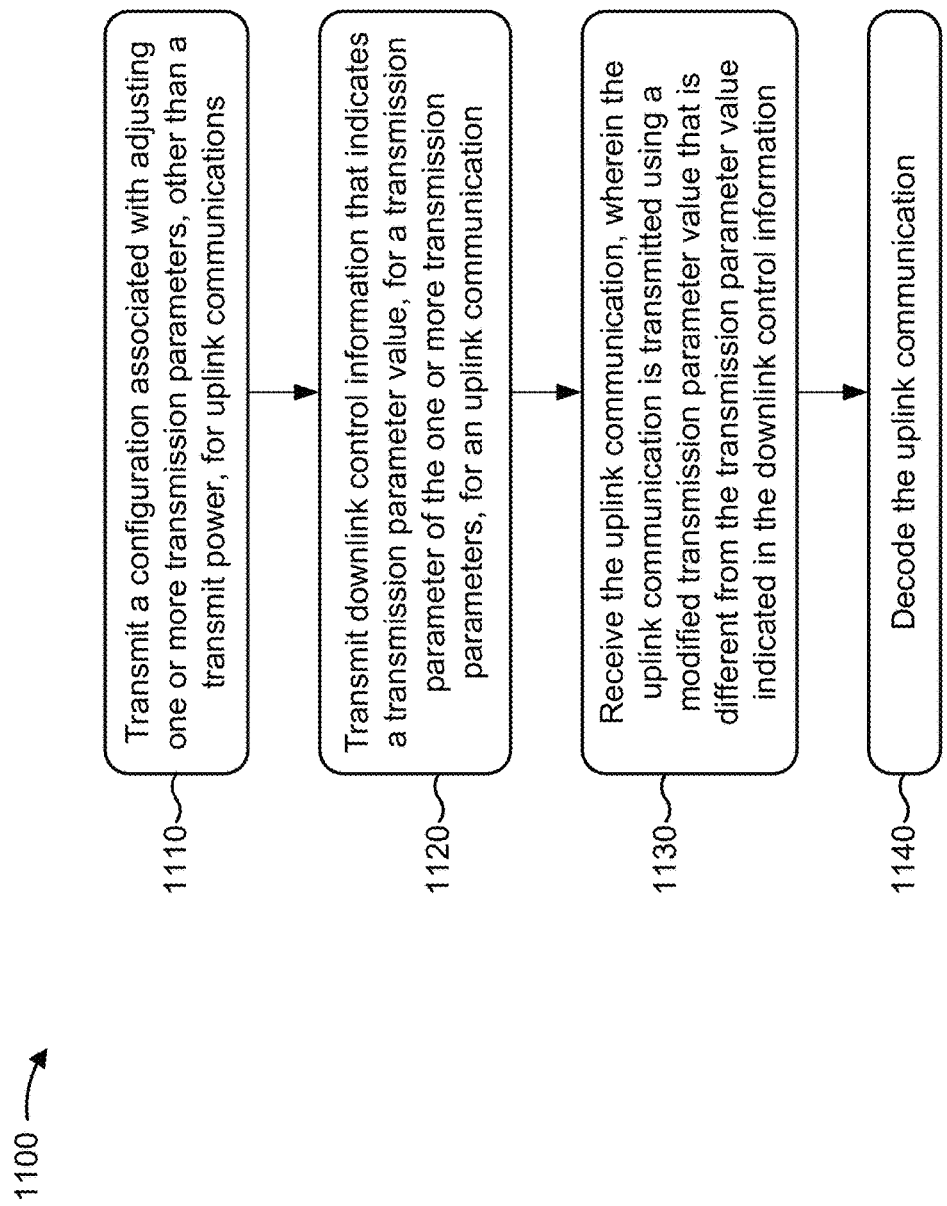

FIG. 11 is a flowchart of a method 1100 of wireless communication. The method may be performed by a base station (e.g., base station 110, apparatus 1402, apparatus 1505, and/or the like).

At 1110, the base station may transmit a configuration associated with modifying one or more transmission parameters, other than a transmit power, for uplink communications. For example, the base station (e.g., using transmit processor 220, controller/processor 240, memory 242, and/or the like) may transmit a configuration associated with modifying one or more transmission parameters, other than a transmit power, for uplink communications, as described above. In some aspects, the at least one transmission parameter includes at least one of: a modulation and coding scheme used for the uplink communication, a transport block size used for the uplink communication, a resource allocation used for the uplink communication, or a combination thereof. In some aspects, the configuration is included in an RRC message.

At 1120, the base station may transmit downlink control information that indicates a transmission parameter value, for a transmission parameter of the one or more transmission parameters, for an uplink communication. For example, the base station (e.g., using transmit processor 220, controller/processor 240, memory 242, and/or the like) may transmit downlink control information that indicates a transmission parameter value, for a transmission parameter of the one or more transmission parameters, for an uplink communication, as described above. In some aspects, the at least one transmission parameter includes at least one of: a modulation and coding scheme used for the uplink communication, a transport block size used for the uplink communication, a resource allocation used for the uplink communication, or a combination thereof.

At 1130, the base station may receive the uplink communication, wherein the uplink communication is transmitted using a modified transmission parameter value that is different from the transmission parameter value indicated in the downlink control information. For example, the base station (e.g., using receive processor 238, controller/processor 240, memory 242, and/or the like) may receive the uplink communication, as described above. In some aspects, the uplink communication is transmitted using a modified transmission parameter value that is different from the transmission parameter value indicated in the downlink control information. In some aspects, the uplink communication is a PUSCH communication.

At 1140, the base station may decode the uplink communication. For example, the base station (e.g., using receive processor 238, controller/processor 240, memory 242, and/or the like) may decode the uplink communication, as described above. In some aspects, the uplink communication is decoded using blind decoding and hypothesis testing for multiple transmission parameter values of the transmission parameter. Additionally, or alternatively, the uplink communication may be decoded based at least in part on an indication of the modified transmission parameter value, which may be received from a UE.

Method 1100 may include additional aspects, such as any single aspect or any combination of aspects described below and/or in connection with one or more other processes described elsewhere herein.

In a first aspect, the uplink communication is decoded using blind decoding and hypothesis testing for multiple transmission parameter values of the transmission parameter.

In a second aspect, alone or in combination with the first aspect, method 1100 includes receiving an indication of the modified transmission parameter value.

In a third aspect, alone or in combination with one or more of the first and second aspects, the modified transmission parameter value is indicated using at least one of a demodulation reference signal parameter of a demodulation reference signal, uplink control information, or a combination thereof.

Although FIG. 11 shows example blocks of method 1100, in some aspects, method 1100 may include additional blocks, fewer blocks, different blocks, or differently arranged blocks than those depicted in FIG. 11. Additionally, or alternatively, two or more of the blocks of method 1100 may be performed in parallel.

Figure 12:
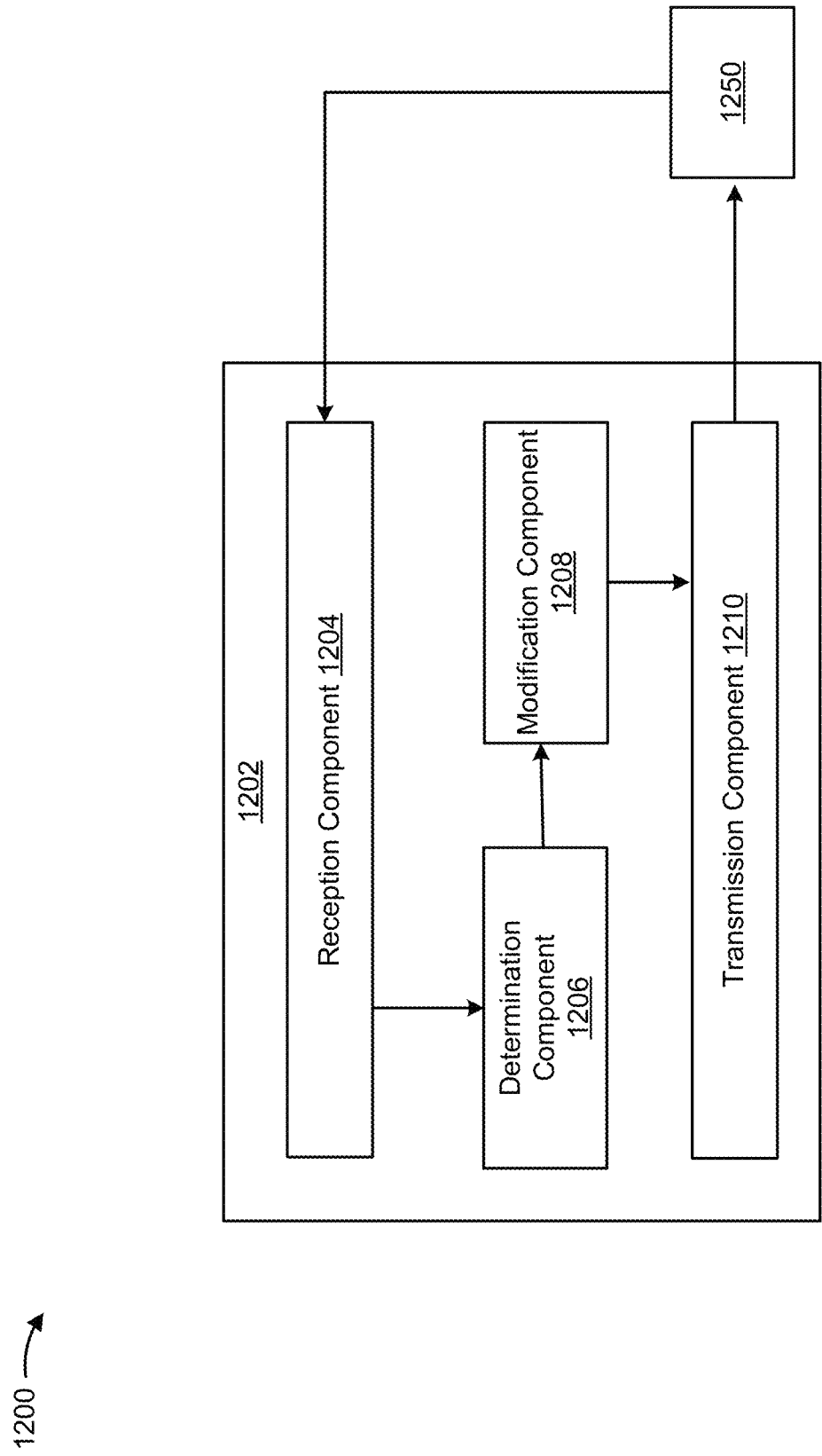
FIG. 12 is a data flow diagram illustrating a data flow between different components in an example apparatus.

FIG. 12 is a data flow diagram 1200 illustrating a data flow between different components in an example apparatus 1202. The apparatus 1202 may be a UE. In some aspects, the apparatus 1202 includes a reception component 1204, a determination component 1206, a modification component 1208, and/or a transmission component 1210.

In some aspects, the reception component 1204 may receive (e.g., from an apparatus 1250, such as a base station) a configuration associated with modifying one or more transmission parameters, other than a transmit power, for uplink communications. The determination component 1206 may determine that a required transmit power for an uplink communication is greater than a maximum transmit power. In some aspects, the determination component 1206 may determine the required transmit power based at least in part on downlink control information for the uplink communication. The modification component 1208 may modify at least one transmission parameter, of the one or more transmission parameters, based at least in part on the configuration and based at least in part on determining that the required transmit power for the uplink communication is greater than the maximum transmit power. The transmission component 1210 may transmit (e.g., to an apparatus 1250, such as a base station) the uplink communication using the modified at least one transmission parameter.

Additionally, or alternatively, the reception component 1204 may receive (e.g., from an apparatus 1250, such as a base station) a configuration associated with modifying one or more transmission parameters, other than a transmit power, for uplink communications. The determination component 1206 may determine a required transmit power for an uplink communication. In some aspects, the determination component 1206 may determine the required transmit power based at least in part on downlink control information for the uplink communication. The determination component 1206 may determine a maximum transmit power for the uplink communication. The modification component 1208 may modify a transmission parameter, of the one or more transmission parameters, based at least in part on the configuration, the required transmit power, and the maximum transmit power. The transmission component 1210 may transmit (e.g., to an apparatus 1250, such as a base station) the uplink communication using the modified transmission parameter.

The apparatus may include additional components that perform each of the blocks of the algorithm in the aforementioned method 900 of FIG. 9, method 1000 of FIG. 10, and/or the like. Each block in the aforementioned method 900 of FIG. 9, method 1000 of FIG. 10, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of components (e.g., one or more components) shown in FIG. 12 may perform one or more functions described as being performed by another set of components shown in FIG. 12.

Figure 13:
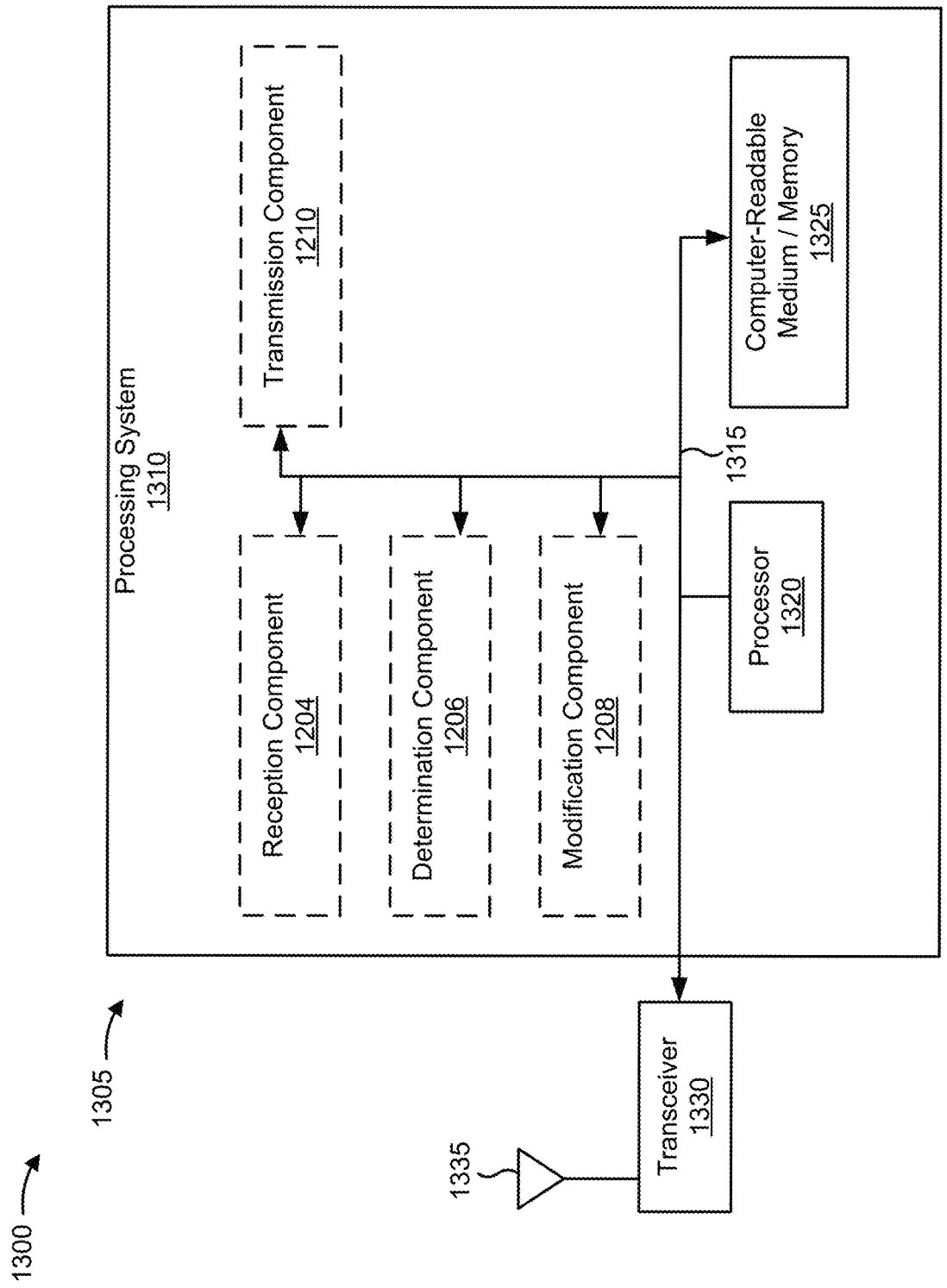
FIG. 13 is a diagram illustrating an example of a hardware implementation for an apparatus employing a processing system.

FIG. 13 is a diagram 1300 illustrating an example of a hardware implementation for an apparatus 1305 employing a processing system 1310. The apparatus 1305 may be a UE.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the components 1204, 1206, 1208, and/or 1210, and the computer-readable medium/memory 1325. The bus 1315 may also link various other circuits such as timing sources, peripherals, voltage regulators, and power management circuits, which are well known in the art, and therefore will not be described any further.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1204. In addition, the transceiver 1330 receives information from the processing system 1310, specifically the transmission component 1210, and based at least in part on the received information, generates a signal to be applied to the one or more antennas 1335.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the components 1204, 1206, 1208, and/or 1210. The components may be software modules miming in the processor 1320, resident/stored in the computer readable medium/memory 1325, one or more hardware modules coupled to the processor 1320, or some combination thereof.

In some aspects, the processing system 1310 may be a component of the UE 120 and may include the memory 282 and/or at least one of the TX MIMO processor 266, the RX processor 258, and/or the controller/processor 280. In some aspects, the apparatus 1305 for wireless communication includes means for receiving a configuration associated with modifying one or more transmission parameters, other than a transmit power, for uplink communications; means for determining that a required transmit power for an uplink communication is greater than a maximum transmit power, wherein the required transmit power is determined based at least in part on downlink control information for the uplink communication; means for modifying at least one transmission parameter, of the one or more transmission parameters, based at least in part on the configuration and based at least in part on determining that the required transmit power for the uplink communication is greater than the maximum transmit power; means for transmitting the uplink communication using the modified at least one transmission parameter; and/or the like. Additionally, or alternatively, the apparatus 1305 for wireless communication may include means for receiving a configuration associated with modifying one or more transmission parameters, other than a transmit power, for uplink communications; means for determining a required transmit power for an uplink communication, wherein the required transmit power is determined based at least in part on downlink control information for the uplink communication; means for determining a maximum transmit power for the uplink communication; means for modifying a transmission parameter, of the one or more transmission parameters, based at least in part on the configuration, the required transmit power, and the maximum transmit power; means for transmitting the uplink communication using the modified transmission parameter; and/or the like. Additionally, or alternatively, the apparatus 1305 may include means for receiving a configuration for uplink communications; means for determining a required transmit power for an uplink communication, wherein the required transmit power is determined based at least in part on a pathloss parameter measured by the apparatus; means for modifying at least one transmission parameter for the uplink communication based at least in part on the configuration if the required transmit power is greater than a maximum transmit power, wherein the at least one transmission parameter includes at least one of a modulation and coding scheme, a transport block size, or a resource allocation; and means for transmitting the uplink communication using the modified at least one transmission parameter.

The aforementioned means may be one or more of the aforementioned components of the apparatus 1202 and/or the processing system 1310 of the apparatus 1305 configured to perform the functions recited by the aforementioned means. As described elsewhere herein, the processing system 1310 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 13 is provided as an example. Other examples may differ from what is described in connection with FIG. 13.

Figure 14:
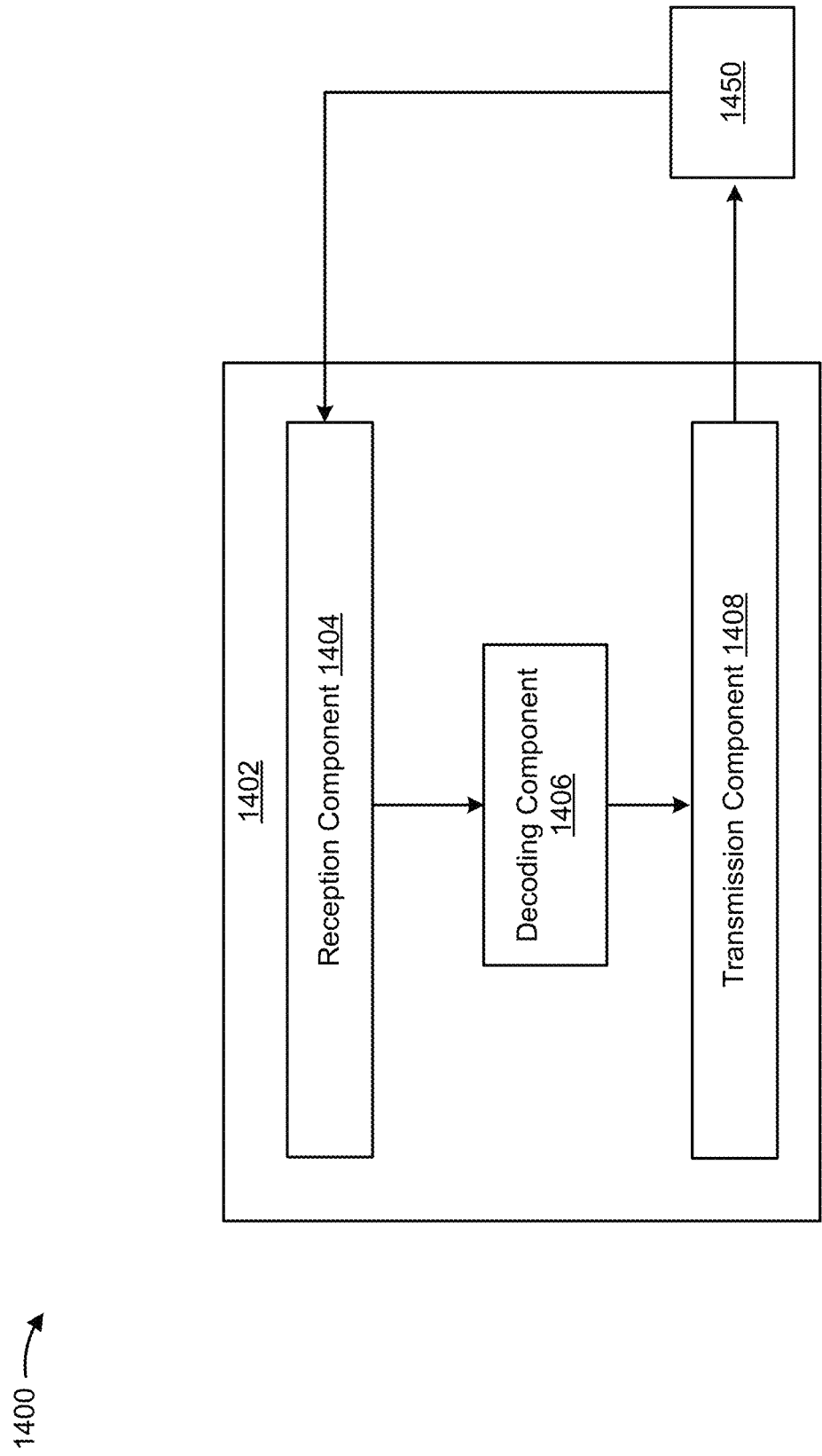
FIG. 14 is a data flow diagram illustrating a data flow between different components in another example apparatus.

FIG. 14 is a data flow diagram 1400 illustrating a data flow between different components in an example apparatus 1402. The apparatus 1402 may be a base station. In some aspects, the apparatus 1402 includes a reception component 1404, a decoding component 1406, and/or a transmission component 1408.

The transmission component 1408 may transmit (e.g., to an apparatus 1450, such as a UE) a configuration associated with modifying one or more transmission parameters, other than a transmit power, for uplink communications. The transmission component 1408 may transmit (e.g., to an apparatus 1450, such as a UE) downlink control information that indicates a transmission parameter value, for a transmission parameter of the one or more transmission parameters, for an uplink communication. The reception component 1404 may receive the uplink communication. The uplink communication may be transmitted by the apparatus 1450 using a modified transmission parameter value that is different from the transmission parameter value indicated in the downlink control information. The decoding component 1406 may decode the uplink communication.

The apparatus may include additional components that perform each of the blocks of the algorithm in the aforementioned method 1100 of FIG. 11 and/or the like. Each block in the aforementioned method 1100 of FIG. 11 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of components (e.g., one or more components) shown in FIG. 14 may perform one or more functions described as being performed by another set of components shown in FIG. 14.

Figure 15:
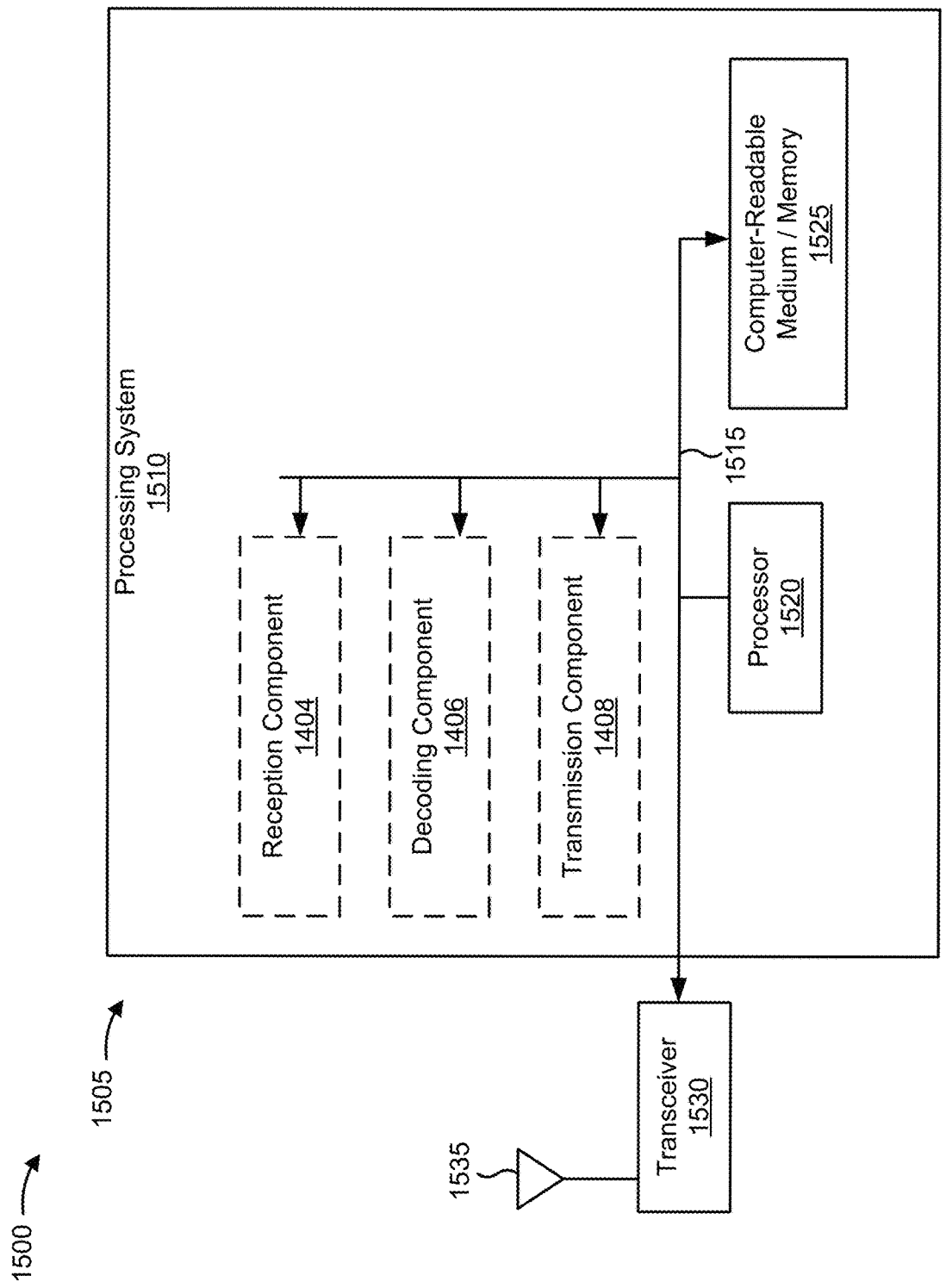
FIG. 15 is a diagram illustrating another example of a hardware implementation for an apparatus employing a processing system.

FIG. 15 is a diagram 1500 illustrating an example of a hardware implementation for an apparatus 1505 employing a processing system 1510. The apparatus 1505 may be a base station.

The processing system 1510 may be implemented with a bus architecture, represented generally by the bus 1515. The bus 1515 may include any number of interconnecting buses and bridges depending on the specific application of the processing system 1510 and the overall design constraints. The bus 1515 links together various circuits including one or more processors and/or hardware components, represented by the processor 1520, the components 1404, 1406, and/or 1408, and the computer-readable medium/memory 1525. The bus 1515 may also link various other circuits such as timing sources, peripherals, voltage regulators, and power management circuits, which are well known in the art, and therefore will not be described any further.

The processing system 1510 may be coupled to a transceiver 1530. The transceiver 1530 is coupled to one or more antennas 1535. The transceiver 1530 provides a means for communicating with various other apparatuses over a transmission medium. The transceiver 1530 receives a signal from the one or more antennas 1535, extracts information from the received signal, and provides the extracted information to the processing system 1510, specifically the reception component 1404. In addition, the transceiver 1530 receives information from the processing system 1510, specifically the transmission component 1408, and based at least in part on the received information, generates a signal to be applied to the one or more antennas 1535.

The processing system 1510 includes a processor 1520 coupled to a computer-readable medium/memory 1525. The processor 1520 is responsible for general processing, including the execution of software stored on the computer-readable medium/memory 1525. The software, when executed by the processor 1520, causes the processing system 1510 to perform the various functions described herein for any particular apparatus. The computer-readable medium/memory 1525 may also be used for storing data that is manipulated by the processor 1520 when executing software. The processing system further includes at least one of the components 1404, 1406, and/or 1408. The components may be software modules running in the processor 1520, resident/stored in the computer readable medium/memory 1525, one or more hardware modules coupled to the processor 1520, or some combination thereof.

In some aspects, the processing system 1510 may be a component of the base station 110 and may include the memory 242 and/or at least one of the TX MIMO processor 230, the RX processor 238, and/or the controller/processor 240. In some aspects, the apparatus 1505 for wireless communication includes means for transmitting a configuration associated with modifying one or more transmission parameters, other than a transmit power, for uplink communications; means for transmitting downlink control information that indicates a transmission parameter value, for a transmission parameter of the one or more transmission parameters, for an uplink communication; means for receiving the uplink communication, wherein the uplink communication is transmitted using a modified transmission parameter value that is different from the transmission parameter value indicated in the downlink control information; means for decoding the uplink communication; and/or the like. The aforementioned means may be one or more of the aforementioned components of the apparatus 1402 and/or the processing system 1510 of the apparatus 1505 configured to perform the functions recited by the aforementioned means. As described elsewhere herein, the processing system 1510 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 15 is provided as an example. Other examples may differ from what is described in connection with FIG. 15.

The following provides an overview of some aspects of the present disclosure:

Aspect 1: A method of wireless communication performed by a user equipment (UE), comprising: receiving a configuration associated with modifying one or more transmission parameters, other than a transmit power, for uplink communications; determining that a required transmit power for an uplink communication is greater than a maximum transmit power, wherein the required transmit power is determined based at least in part on downlink control information for the uplink communication; modifying at least one transmission parameter, of the one or more transmission parameters, based at least in part on the configuration and based at least in part on determining that the required transmit power for the uplink communication is greater than the maximum transmit power; and transmitting the uplink communication using the modified at least one transmission parameter.

Aspect 2: The method of aspect 1, wherein the at least one transmission parameter includes at least one of: a modulation and coding scheme used for the uplink communication, a transport block size used for the uplink communication, a resource allocation used for the uplink communication, or a combination thereof.

Aspect 3: The method of any of aspects 1-2, wherein the required transmit power is determined based at least in part on a pathloss parameter measured by the UE.

Aspect 4: The method of any of aspects 1-3, wherein the configuration indicates a power delta and a corresponding one or more transmission parameter deltas.

Aspect 5: The method of aspect 4, further comprising: identifying a transmission parameter delta, of the one or more transmission parameter deltas, based at least in part on the power delta and a difference between the required transmit power and the maximum transmit power; and modifying the at least one transmission parameter by applying the transmission parameter delta to a transmission parameter value indicated in the downlink control information.

Aspect 6: The method of any of aspects 1-5, wherein the configuration indicates one or more absolute power levels required by a base station and a corresponding one or more fallback transmission parameter values.

Aspect 7: The method of aspect 6, further comprising: identifying a fallback transmission parameter value, of the one or more fallback transmission parameter values, based at least in part on the one or more absolute power levels and a power level estimated by the UE for the uplink communication; and modifying the at least one transmission parameter by using the fallback transmission parameter value instead of a transmission parameter value indicated in the downlink control information.

Aspect 8: The method of any of aspects 1-7, wherein the configuration indicates one or more relative power levels associated with a base station and a corresponding one or more fallback transmission parameter values.

Aspect 9: The method of aspect 8, further comprising: identifying a fallback transmission parameter value, of the one or more fallback transmission parameter values, based at least in part on the one or more relative power levels and a difference between the required transmit power and the maximum transmit power; and modifying the at least one transmission parameter by using the fallback transmission parameter value instead of a transmission parameter value indicated in the downlink control information.

Aspect 10: The method of any of aspects 8-9, wherein the one or more relative power levels are a subset of a set of relative power levels indicated in the configuration, the corresponding one or more fallback transmission parameter values are a subset of a set of transmission parameter values indicated in the configuration, and the set of relative power levels corresponds to the set of transmission parameter values.

Aspect 11: The method of any of aspects 1-10, wherein the configuration indicates, for each transmission parameter value of a set of transmission parameter values, one or more power thresholds and a corresponding one or more fallback transmission parameter values.

Aspect 12: The method of aspect 11, further comprising: identifying a fallback transmission parameter value, of the one or more fallback transmission parameter values, based at least in part on the one or more power thresholds and a difference between the required transmit power and the maximum transmit power; and modifying the at least one transmission parameter by using the fallback transmission parameter value instead of a transmission parameter value indicated in the downlink control information.

Aspect 13: The method of any of aspects 1-12, wherein the uplink communication is transmitted with a transmit power that is determined based at least in part on the modified at least one transmission parameter.

Aspect 14: The method of any of aspects 1-13, wherein the modified at least one transmission parameter is not signaled to a base station.

Aspect 15: The method of any of aspects 1-13, further comprising transmitting an indication of the modified at least one transmission parameter in uplink control information.

Aspect 16: The method of any of aspects 1-15, further comprising transmitting a demodulation reference signal using a demodulation reference signal parameter that is selected based at least in part on the modified at least one transmission parameter.

Aspect 17: The method of any of aspects 1-16, wherein the uplink communication is an initial transmission.

Aspect 18: The method of aspect 17, further comprising transmitting a retransmission of the initial transmission using a same transmission parameter as the initial transmission.

Aspect 19: The method of any of aspects 1-18, further comprising: determining whether the uplink communication is an initial transmission or a retransmission; and wherein modifying the at least one transmission parameter is based at least in part on determining whether the uplink communication is an initial transmission or a retransmission, wherein the at least one transmission parameter is modified if the uplink communication is determined to be an initial uplink transmission, or wherein the same transmission parameter that is used for the initial transmission is also used for the retransmission if the uplink communication is determined to be a retransmission. wherein modifying the at least one transmission parameter is based at least in part on determining whether the uplink communication is an initial transmission or a retransmission, wherein the at least one transmission parameter is modified if the uplink communication is determined to be an initial uplink transmission, or wherein the same transmission parameter that is used for the initial transmission is also used for the retransmission if the uplink communication is determined to be a retransmission.

Aspect 20: The method of any of aspects 1-19, wherein the at least one transmission parameter is modified based at least in part on at least one of: a fallback transmission parameter activation signal received from a base station, a determination that the uplink communication is a type of uplink communication for which a fallback transmission parameter procedure is enabled, or a combination thereof.

Aspect 21: The method of any of aspects 1-20, further comprising transmitting a power headroom report based at least in part on modifying the at least one transmission parameter.

Aspect 22: The method of any of aspects 1-21, wherein the at least one transmission parameter is modified based at least in part on a modified maximum transmit power associated with the modified at least one transmission parameter, wherein the modified maximum transmit power is different from the maximum transmit power.

Aspect 23: A method of wireless communication performed by a user equipment (UE), comprising: receiving a configuration associated with modifying one or more transmission parameters, other than a transmit power, for uplink communications; determining a required transmit power for an uplink communication, wherein the required transmit power is determined based at least in part on downlink control information for the uplink communication; determining a maximum transmit power for the uplink communication; modifying a transmission parameter, of the one or more transmission parameters, based at least in part on the configuration, the required transmit power, and the maximum transmit power; and transmitting the uplink communication using the modified transmission parameter.

Aspect 24: The method of aspect 23, wherein the maximum transmit power for the uplink communication is determined based at least in part on at least one of: the downlink control information, a transmit power used for a prior uplink communication that precedes the uplink communication, a global maximum transmit power, or a combination thereof.

Aspect 25: A method of wireless communication performed by a base station, comprising: transmitting a configuration associated with modifying one or more transmission parameters, other than a transmit power, for uplink communications; transmitting downlink control information that indicates a transmission parameter value, for a transmission parameter of the one or more transmission parameters, for an uplink communication; receiving the uplink communication, wherein the uplink communication is transmitted using a modified transmission parameter value that is different from the transmission parameter value indicated in the downlink control information; and decoding the uplink communication.

Aspect 26: The method of aspect 25, wherein the uplink communication is decoded using blind decoding and hypothesis testing for multiple transmission parameter values of the transmission parameter.

Aspect 27: The method of any of aspects 25-26, further comprising receiving an indication of the modified transmission parameter value.

Aspect 28: The method of aspect 27, wherein the modified transmission parameter value is indicated using at least one of a demodulation reference signal parameter of a demodulation reference signal, uplink control information, or a combination thereof.

Aspect 29: An apparatus for wireless communication at a device, comprising a processor; memory coupled with the processor; and instructions stored in the memory and executable by the processor to cause the apparatus to perform the method of one or more aspects of aspects 1-22.

Aspect 30: A device for wireless communication, comprising a memory and one or more processors coupled to the memory, the memory and the one or more processors configured to perform the method of one or more aspects of aspects 1-22.

Aspect 31: An apparatus for wireless communication, comprising at least one means for performing the method of one or more aspects of aspects 1-22.

Aspect 32: A non-transitory computer-readable medium storing code for wireless communication, the code comprising instructions executable by a processor to perform the method of one or more aspects of aspects 1-22.

Aspect 33: A non-transitory computer-readable medium storing a set of instructions for wireless communication, the set of instructions comprising one or more instructions that, when executed by one or more processors of a device, cause the device to perform the method of one or more aspects of aspects 1-22.

Aspect 34: An apparatus for wireless communication at a device, comprising a processor; memory coupled with the processor; and instructions stored in the memory and executable by the processor to cause the apparatus to perform the method of one or more aspects of aspects 23-24.

Aspect 35: A device for wireless communication, comprising a memory and one or more processors coupled to the memory, the memory and the one or more processors configured to perform the method of one or more aspects of aspects 23-24.

Aspect 36: An apparatus for wireless communication, comprising at least one means for performing the method of one or more aspects of aspects 23-24.

Aspect 37: A non-transitory computer-readable medium storing code for wireless communication, the code comprising instructions executable by a processor to perform the method of one or more aspects of aspects 23-24.

Aspect 38: A non-transitory computer-readable medium storing a set of instructions for wireless communication, the set of instructions comprising one or more instructions that, when executed by one or more processors of a device, cause the device to perform the method of one or more aspects of aspects 23-24.

Aspect 39: An apparatus for wireless communication at a device, comprising a processor; memory coupled with the processor; and instructions stored in the memory and executable by the processor to cause the apparatus to perform the method of one or more aspects of aspects 25-28.

Aspect 40: A device for wireless communication, comprising a memory and one or more processors coupled to the memory, the memory and the one or more processors configured to perform the method of one or more aspects of aspects 25-28.

Aspect 41: An apparatus for wireless communication, comprising at least one means for performing the method of one or more aspects of aspects 25-28.

Aspect 42: A non-transitory computer-readable medium storing code for wireless communication, the code comprising instructions executable by a processor to perform the method of one or more aspects of aspects 25-28.

Aspect 43: A non-transitory computer-readable medium storing a set of instructions for wireless communication, the set of instructions comprising one or more instructions that, when executed by one or more processors of a device, cause the device to perform the method of one or more aspects of aspects 25-28.

Aspect 44: A method of wireless communication performed by a user equipment (UE), comprising: receiving a configuration for uplink communications; determining a required transmit power for an uplink communication, wherein the required transmit power is determined based at least in part on a pathloss parameter measured by the UE; modifying at least one transmission parameter for the uplink communication based at least in part on the configuration if the required transmit power is greater than a maximum transmit power, wherein the at least one transmission parameter includes at least one of a modulation and coding scheme, a transport block size, or a resource allocation; and transmitting the uplink communication using the modified at least one transmission parameter.

Aspect 45: The method of Aspect 44, wherein the required transmit power is determined based at least in part on the pathloss parameter measured by the UE.

Aspect 46: The method of any of Aspects 44-45, wherein the configuration indicates a power delta and a corresponding one or more transmission parameter deltas.

Aspect 47: The method of Aspect 46, further comprising: identifying a transmission parameter delta, of the one or more transmission parameter deltas, based at least in part on the power delta and a difference between the required transmit power and the maximum transmit power; and modifying the at least one transmission parameter by applying the transmission parameter delta to a transmission parameter value indicated in downlink control information.

Aspect 48: The method of any of Aspects 44-47, wherein the configuration indicates one or more absolute power levels required by a base station and a corresponding one or more fallback transmission parameter values.

Aspect 49: The method of Aspect 48, further comprising: identifying a fallback transmission parameter value, of the one or more fallback transmission parameter values, based at least in part on the one or more absolute power levels and a power level estimated by the UE for the uplink communication; and modifying the at least one transmission parameter by using the fallback transmission parameter value instead of a transmission parameter value indicated in downlink control information.

Aspect 50: The method of any of Aspects 44-49, wherein the configuration indicates one or more relative power levels associated with a base station and a corresponding one or more fallback transmission parameter values.

Aspect 51: The method of Aspect 50, further comprising: identifying a fallback transmission parameter value, of the one or more fallback transmission parameter values, based at least in part on the one or more relative power levels and a difference between the required transmit power and the maximum transmit power; and modifying the at least one transmission parameter by using the fallback transmission parameter value instead of a transmission parameter value indicated in downlink control information.

Aspect 52: The method of Aspect 50, wherein the one or more relative power levels are a subset of a set of relative power levels indicated in the configuration, the corresponding one or more fallback transmission parameter values are a subset of a set of transmission parameter values indicated in the configuration, and the set of relative power levels corresponds to the set of transmission parameter values.

Aspect 53: The method of any of Aspects 44-52, wherein the configuration indicates, for each transmission parameter value of a set of transmission parameter values, one or more power thresholds and a corresponding one or more fallback transmission parameter values.

Aspect 54: The method of Aspect 53, further comprising: identifying a fallback transmission parameter value, of the one or more fallback transmission parameter values, based at least in part on the one or more power thresholds and a difference between the required transmit power and the maximum transmit power; and modifying the at least one transmission parameter by using the fallback transmission parameter value instead of a transmission parameter value indicated in downlink control information.

Aspect 55: The method of any of Aspects 44-54, wherein the uplink communication is transmitted with a transmit power that is determined based at least in part on the modified at least one transmission parameter.

Aspect 56: The method of any of Aspects 44-55, wherein the modified at least one transmission parameter is not signaled to a base station.

Aspect 57: The method of any of Aspects 44-56, further comprising transmitting a demodulation reference signal using a demodulation reference signal parameter that is selected based at least in part on the modified at least one transmission parameter.

Aspect 58: The method of any of Aspects 44-57, further comprising transmitting an indication of the modified at least one transmission parameter in uplink control information.

Aspect 59: The method of any of Aspects 44-58, wherein the uplink communication is an initial transmission.

Aspect 60: The method of Aspect 59, further comprising transmitting a retransmission of the initial transmission using a same transmission parameter as the initial transmission.

Aspect 61: The method of any of Aspects 44-60, further comprising: determining whether the uplink communication is an initial transmission or a retransmission; and wherein modifying the at least one transmission parameter is based at least in part on determining whether the uplink communication is an initial transmission or a retransmission, wherein the at least one transmission parameter is modified if the uplink communication is determined to be an initial uplink transmission, or wherein the same transmission parameter that is used for the initial transmission is also used for the retransmission if the uplink communication is determined to be a retransmission. wherein modifying the at least one transmission parameter is based at least in part on determining whether the uplink communication is an initial transmission or a retransmission, wherein the at least one transmission parameter is modified if the uplink communication is determined to be an initial uplink transmission, or wherein the same transmission parameter that is used for the initial transmission is also used for the retransmission if the uplink communication is determined to be a retransmission.

Aspect 62: The method of any of Aspects 44-61, wherein the at least one transmission parameter is modified based at least in part on at least one of: a fallback transmission parameter activation signal received from a base station, a determination that the uplink communication is a type of uplink communication for which a fallback transmission parameter procedure is enabled, or a combination thereof.

Aspect 63: The method of any of Aspects 44-62, further comprising transmitting a power headroom report based at least in part on modifying the at least one transmission parameter.

Aspect 64: The method of any of Aspects 44-63, wherein the at least one transmission parameter is modified based at least in part on a modified maximum transmit power associated with the modified at least one transmission parameter, wherein the modified maximum transmit power is different from the maximum transmit power.

Aspect 65: The method of any of Aspects 44-64, wherein the maximum transmit power for the uplink communication is determined based at least in part on at least one of:

downlink control information, a transmit power used for a prior uplink communication that precedes the uplink communication, a global maximum transmit power, or a combination thereof.

Aspect 66: An apparatus for wireless communication at a device, comprising a processor; memory coupled with the processor; and instructions stored in the memory and executable by the processor to cause the apparatus to perform the method of one or more Aspects of Aspects 44-65.

Aspect 67: A device for wireless communication, comprising a memory and one or more processors coupled to the memory, the memory and the one or more processors configured to perform the method of one or more Aspects of Aspects 44-65.

Aspect 68: An apparatus for wireless communication, comprising at least one means for performing the method of one or more Aspects of Aspects 44-65.

Aspect 69: A non-transitory computer-readable medium storing code for wireless communication, the code comprising instructions executable by a processor to perform the method of one or more Aspects of Aspects 44-65.

Aspect 70: A non-transitory computer-readable medium storing a set of instructions for wireless communication, the set of instructions comprising one or more instructions that, when executed by one or more processors of a device, cause the device to perform the method of one or more Aspects of Aspects 44-65.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   receiving a configuration for uplink communications;
   determining a required transmit power for an uplink communication, wherein the required transmit power is determined based at least in part on a pathloss parameter measured by the UE;
   modifying at least one transmission parameter for the uplink communication based at least in part on the configuration if the required transmit power is greater than a maximum transmit power, wherein the at least one transmission parameter includes at least one of a modulation and coding scheme, a transport block size, or a resource allocation; and
   transmitting the uplink communication using the modified at least one transmission parameter.

2. The method of claim 1, wherein the required transmit power is determined based at least in part on the pathloss parameter measured by the UE.

3. The method of claim 1, wherein the configuration indicates a power delta and a corresponding one or more transmission parameter deltas.

4. The method of claim 3, further comprising:
   identifying a transmission parameter delta, of the one or more transmission parameter deltas, based at least in part on the power delta and a difference between the required transmit power and the maximum transmit power; and
   modifying the at least one transmission parameter by applying the transmission parameter delta to a transmission parameter value indicated in downlink control information.

5. The method of claim 1, wherein the configuration indicates one or more absolute power levels required by a base station and a corresponding one or more fallback transmission parameter values.

6. The method of claim 5, further comprising:
   identifying a fallback transmission parameter value, of the one or more fallback transmission parameter values, based at least in part on the one or more absolute power levels and a power level estimated by the UE for the uplink communication; and
   modifying the at least one transmission parameter by using the fallback transmission parameter value instead of a transmission parameter value indicated in downlink control information.

7. The method of claim 1, wherein the configuration indicates one or more relative power levels associated with a base station and a corresponding one or more fallback transmission parameter values.

8. The method of claim 7, further comprising:
   identifying a fallback transmission parameter value, of the one or more fallback transmission parameter values, based at least in part on the one or more relative power levels and a difference between the required transmit power and the maximum transmit power; and
   modifying the at least one transmission parameter by using the fallback transmission parameter value instead of a transmission parameter value indicated in downlink control information.

9. The method of claim 7, wherein the one or more relative power levels are a subset of a set of relative power levels indicated in the configuration, the corresponding one or more fallback transmission parameter values are a subset of a set of transmission parameter values indicated in the configuration, and the set of relative power levels corresponds to the set of transmission parameter values.

10. The method of claim 1, wherein the configuration indicates, for each transmission parameter value of a set of transmission parameter values, one or more power thresholds and a corresponding one or more fallback transmission parameter values.

11. The method of claim 10, further comprising:
identifying a fallback transmission parameter value, of the one or more fallback transmission parameter values, based at least in part on the one or more power thresholds and a difference between the required transmit power and the maximum transmit power; and
modifying the at least one transmission parameter by using the fallback transmission parameter value instead of a transmission parameter value indicated in downlink control information.

12. The method of claim 1, wherein the uplink communication is transmitted with a transmit power that is determined based at least in part on the modified at least one transmission parameter.

13. The method of claim 1, wherein the modified at least one transmission parameter is not signaled to a base station.

14. The method of claim 1, further comprising transmitting a demodulation reference signal using a demodulation reference signal parameter that is selected based at least in part on the modified at least one transmission parameter.

15. The method of claim 1, further comprising transmitting an indication of the modified at least one transmission parameter in uplink control information.

16. The method of claim 1, wherein the uplink communication is an initial transmission.

17. The method of claim 16, further comprising transmitting a retransmission of the initial transmission using a same transmission parameter as the initial transmission.

18. The method of claim 1, further comprising:
determining whether the uplink communication is an initial transmission or a retransmission; and
wherein modifying the at least one transmission parameter is based at least in part on determining whether the uplink communication is an initial transmission or a retransmission,
wherein the at least one transmission parameter is modified if the uplink communication is determined to be an initial uplink transmission, or
wherein the same transmission parameter that is used for the initial transmission is also used for the retransmission if the uplink communication is determined to be a retransmission.

19. The method of claim 1, wherein the at least one transmission parameter is modified based at least in part on at least one of:
a fallback transmission parameter activation signal received from a base station,
a determination that the uplink communication is a type of uplink communication for which a fallback transmission parameter procedure is enabled, or
a combination thereof.

20. The method of claim 1, further comprising transmitting a power headroom report based at least in part on modifying the at least one transmission parameter.

21. The method of claim 1, wherein the at least one transmission parameter is modified based at least in part on a modified maximum transmit power associated with the modified at least one transmission parameter, wherein the modified maximum transmit power is different from the maximum transmit power.

22. The method of claim 1, wherein the maximum transmit power for the uplink communication is determined based at least in part on at least one of:
downlink control information,
a transmit power used for a prior uplink communication that precedes the uplink communication,
a global maximum transmit power, or
a combination thereof.

23. A method of wireless communication performed by a base station, comprising:
transmitting a configuration associated with modifying one or more transmission parameters, other than a transmit power, for uplink communications;
transmitting downlink control information that indicates a transmission parameter value, for a transmission parameter of the one or more transmission parameters, for an uplink communication;
receiving the uplink communication, wherein the uplink communication is transmitted using a modified transmission parameter value that is different from the transmission parameter value indicated in the downlink control information, a required transmit power for the uplink communication being determined based at least in part on a measured pathloss parameter, the required transmit power being greater than a maximum transmit power, the modified transmission parameter value being modified based at least in part on the configuration based at least in part on the required transmit power being greater than the maximum transmit power, a transmission parameter corresponding to the modified transmission parameter value including at least one of a modulation and coding scheme, a transport block size, or a resource allocation; and
decoding the uplink communication.

24. The method of claim 23, wherein the uplink communication is decoded using blind decoding and hypothesis testing for multiple transmission parameter values of the transmission parameter.

25. The method of claim 23, further comprising receiving an indication of the modified transmission parameter value.

26. The method of claim 25, wherein the modified transmission parameter value is indicated using at least one of a demodulation reference signal parameter of a demodulation reference signal, uplink control information, or a combination thereof.

27. A user equipment (UE) for wireless communication, comprising:
a memory; and
one or more processors operatively coupled to the memory, the memory and the one or more processors configured to:
receive a configuration for uplink communications;
determine a required transmit power for an uplink communication, wherein the required transmit power is determined based at least in part on a pathloss parameter measured by the UE;
modify at least one transmission parameter for the uplink communication based at least in part on the configuration if the required transmit power is greater than a maximum transmit power, wherein the at least one transmission parameter includes at least one of a modulation and coding scheme, a transport block size, or a resource allocation; and transmit the uplink communication using the modified at least one transmission parameter.

28. The UE of claim 27, wherein the required transmit power is determined based at least in part on the pathloss parameter measured by the UE.

29. The UE of claim 27, wherein the configuration indicates a power delta and a corresponding one or more transmission parameter deltas.

30. An apparatus for wireless communication, comprising:
- means for receiving a configuration for uplink communications;
- means for determining a required transmit power for an uplink communication, wherein the required transmit power is determined based at least in part on a pathloss parameter measured by the apparatus;
- means for modifying at least one transmission parameter for the uplink communication based at least in part on the configuration if the required transmit power is greater than a maximum transmit power, wherein the at least one transmission parameter includes at least one of a modulation and coding scheme, a transport block size, or a resource allocation; and
- means for transmitting the uplink communication using the modified at least one transmission parameter.

* * * * *